United States Patent [19]

Shikama

[11] Patent Number: 5,519,537
[45] Date of Patent: May 21, 1996

[54] RETROFOCUS PROJECTION LENS

[75] Inventor: Shinsuke Shikama, Nagaokakyo, Japan

[73] Assignee: Mitsubishi Denki Kabushiki Kaisha, Tokyo, Japan

[21] Appl. No.: 421,888

[22] Filed: Apr. 14, 1995

[30] Foreign Application Priority Data

| Apr. 20, 1994 | [JP] | Japan | 6-081602 |
| Apr. 28, 1994 | [JP] | Japan | 6-114296 |
| Nov. 28, 1994 | [JP] | Japan | 6-292989 |
| Feb. 16, 1995 | [JP] | Japan | 7-028253 |

[51] Int. Cl.$^6$ ............................ G02B 3/00; G02B 9/00
[52] U.S. Cl. ........................................ 359/649; 359/740
[58] Field of Search .............................. 359/649, 650, 359/740

[56] References Cited

U.S. PATENT DOCUMENTS

| 5,260,832 | 11/1993 | Togino et al. ............ 359/649 |
| 5,319,495 | 6/1994 | Yamada .................. 359/649 |

FOREIGN PATENT DOCUMENTS

| 49-49623 | 5/1974 | Japan . |
| 5-173066 | 7/1993 | Japan . |
| 5-188287 | 7/1993 | Japan . |

*Primary Examiner*—Georgia Y. Epps
*Assistant Examiner*—Evelyn A. Lester

[57] ABSTRACT

A retrofocus projection lens comprises a first lens group having a negative refracting power, a second lens group having a positive refracting power, and a third lens group having a positive refracting power. The first to third lens groups are arranged in this order from a large conjugate side. The first lens group includes a convex negative meniscus lens on the large conjugate side, the second lens group includes a biconvex positive lens, and the third lens group includes, in order from the large conjugate side, a biconcave negative lens, a convex positive meniscus lens on a small conjugate side and a biconvex positive lens. The first to third lens groups satisfy the following relations (1) to (3):

$$0.25 < D_1/f < 0.55 \quad (1)$$

$$0.05 < f_2/f_3 < 0.4 \quad (2)$$

$$0.8 < |f_{1U}/f| < 1.2 \quad (3)$$

where $D_1$ is air gap between the first lens group and the second lens group, $f_1$ is focal length of the first lens group, $f_2$ is focal length of the second lens group, $f_3$ is focal length of the third lens group, and f is focal length of whole lens system including the first to third lens groups.

5 Claims, 22 Drawing Sheets

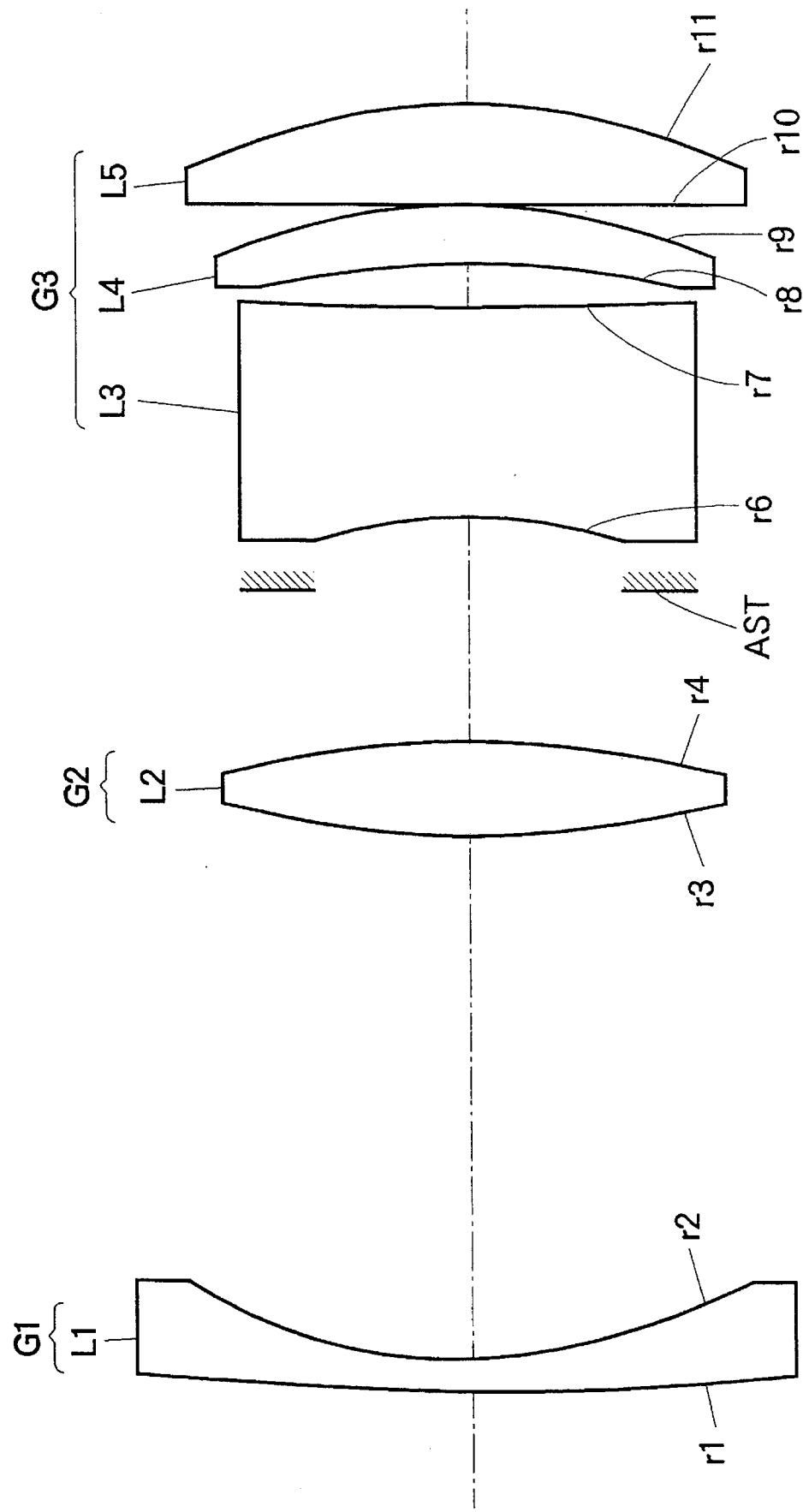

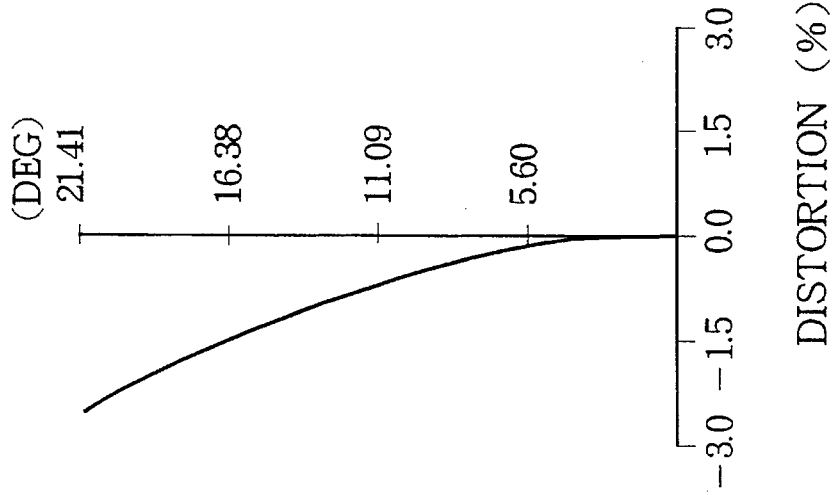
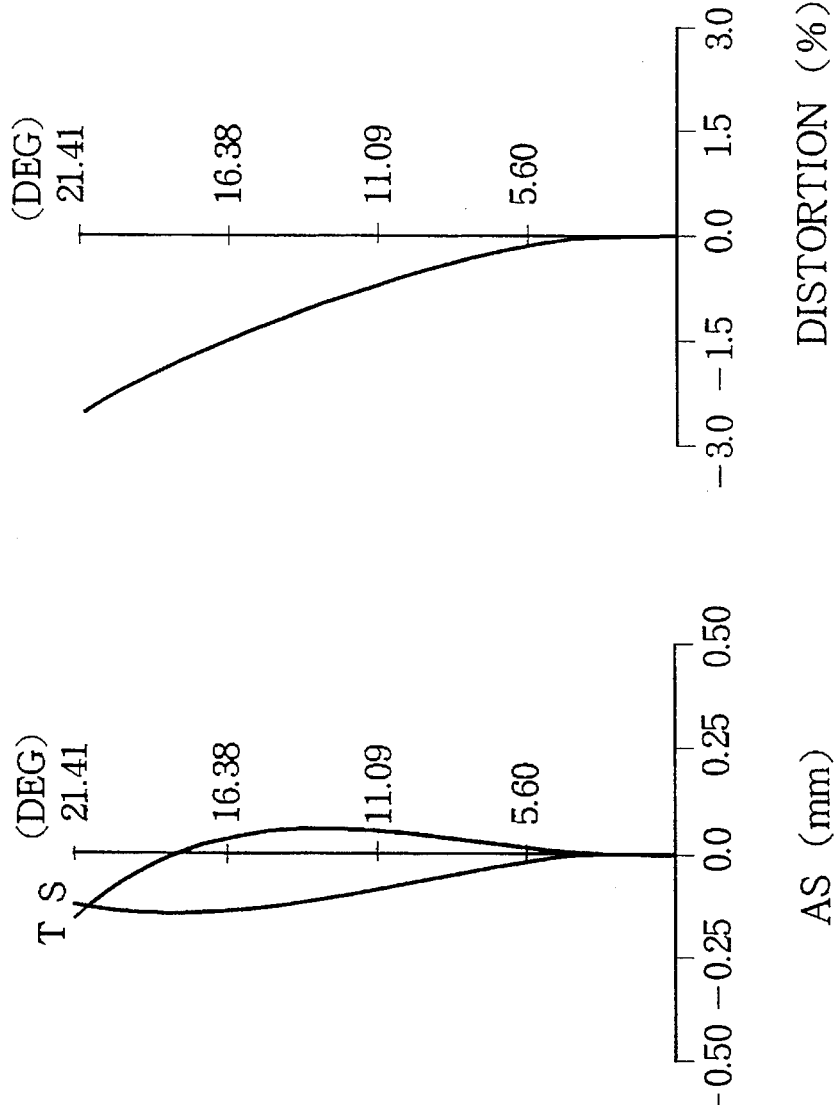
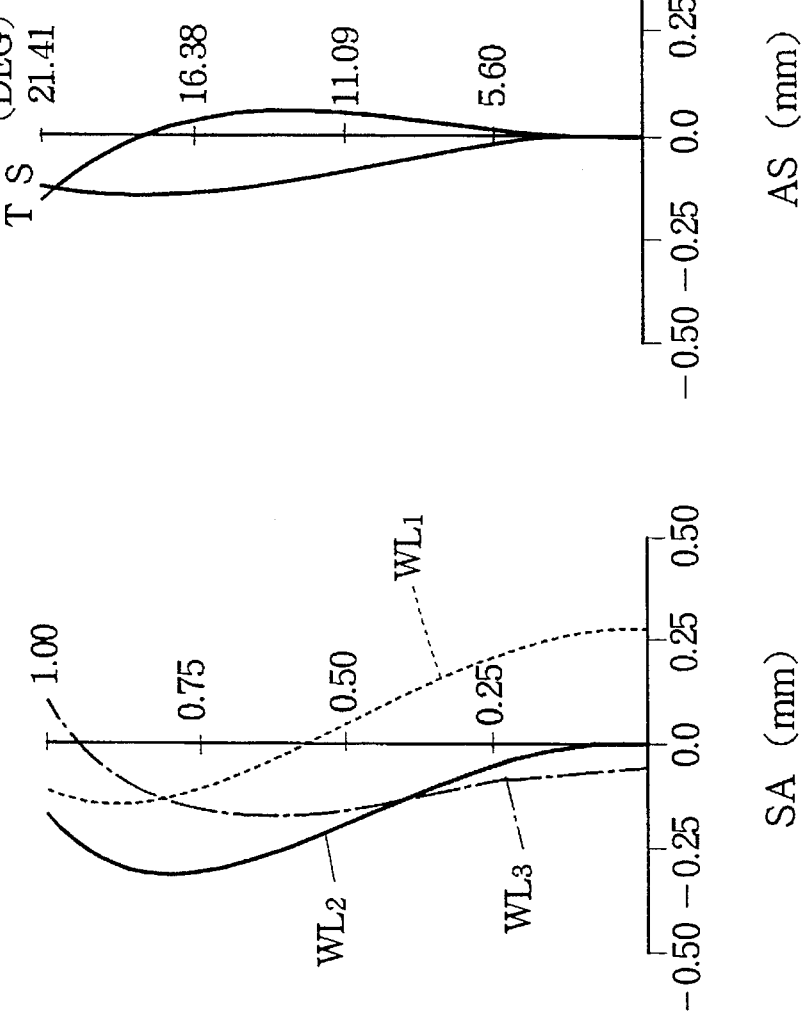
FIG.2C DISTORTION
FIG.2B ASTIGMATIC FIELD CURVES
FIG.2A LONGITUDINAL SPHERICAL ABER.

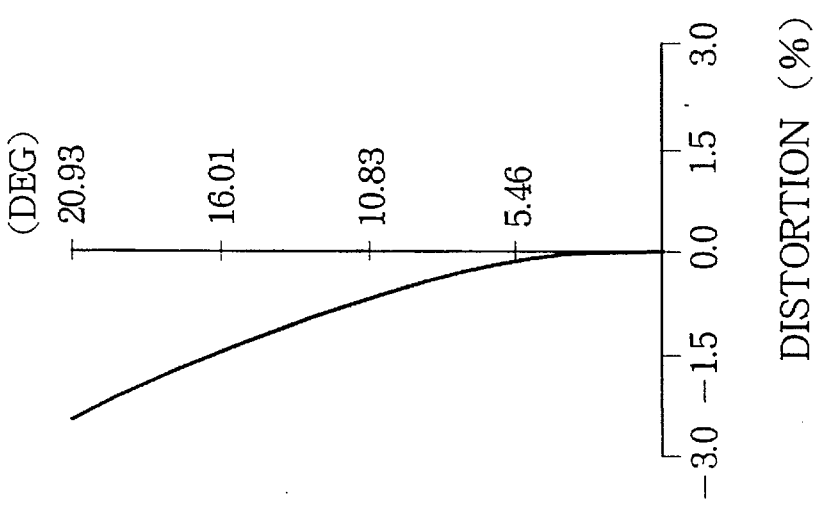
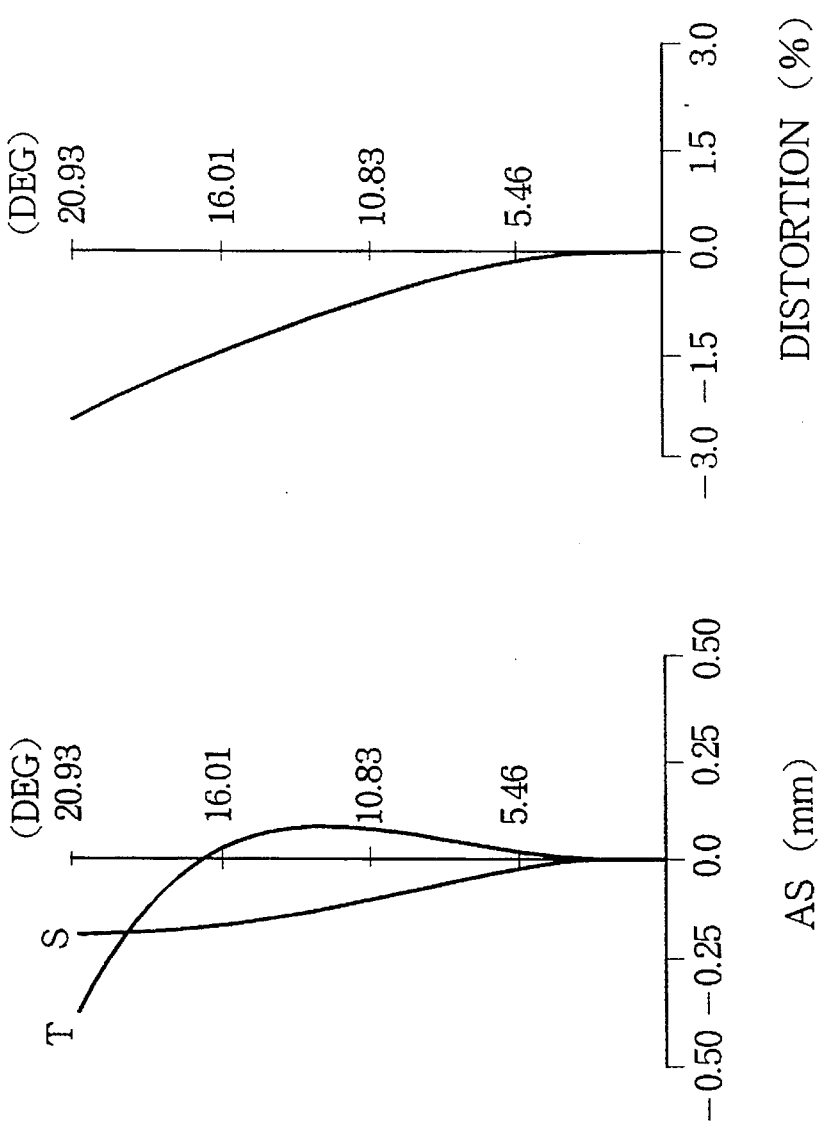
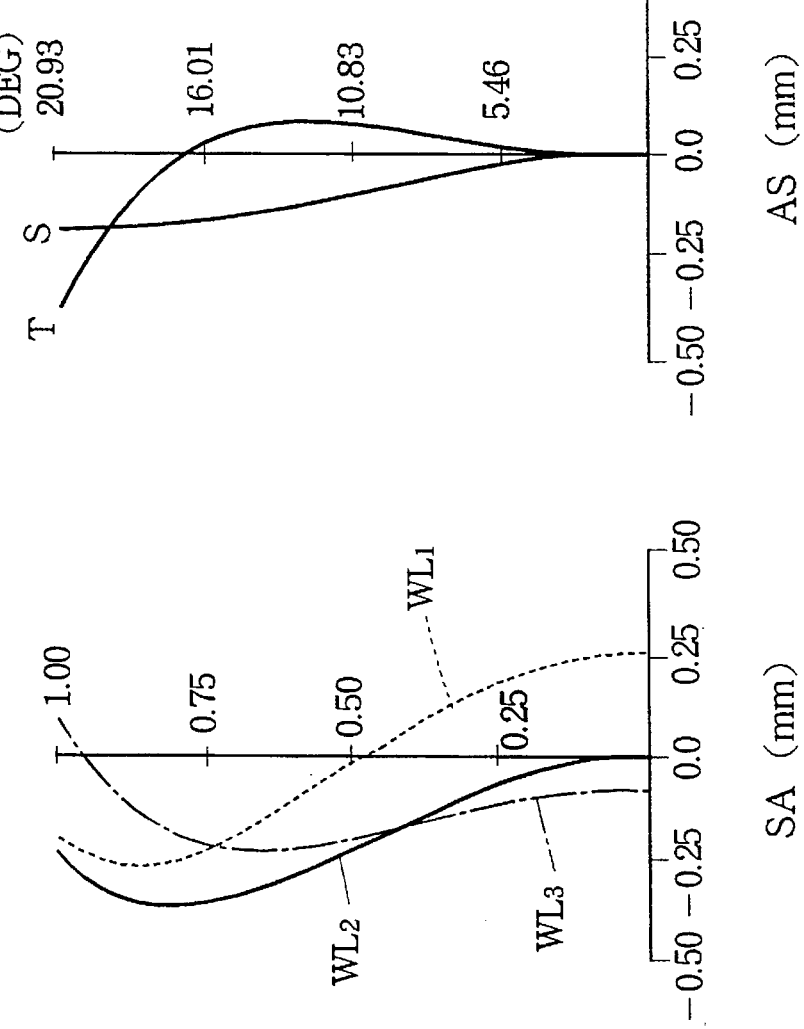

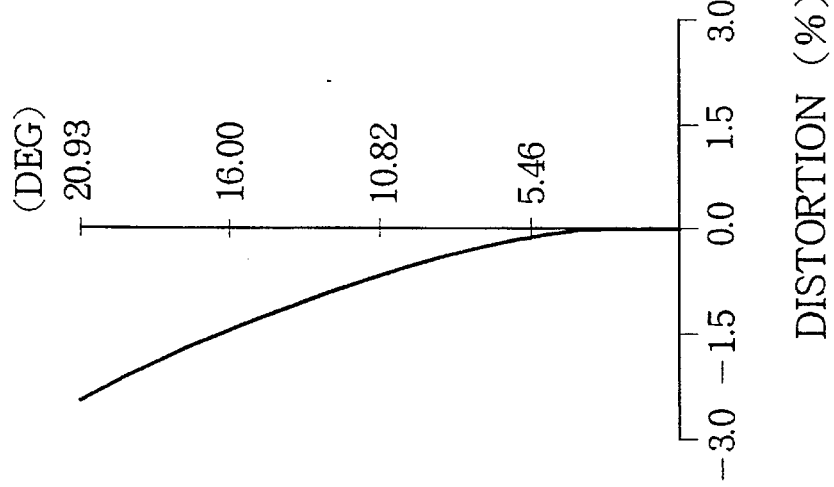
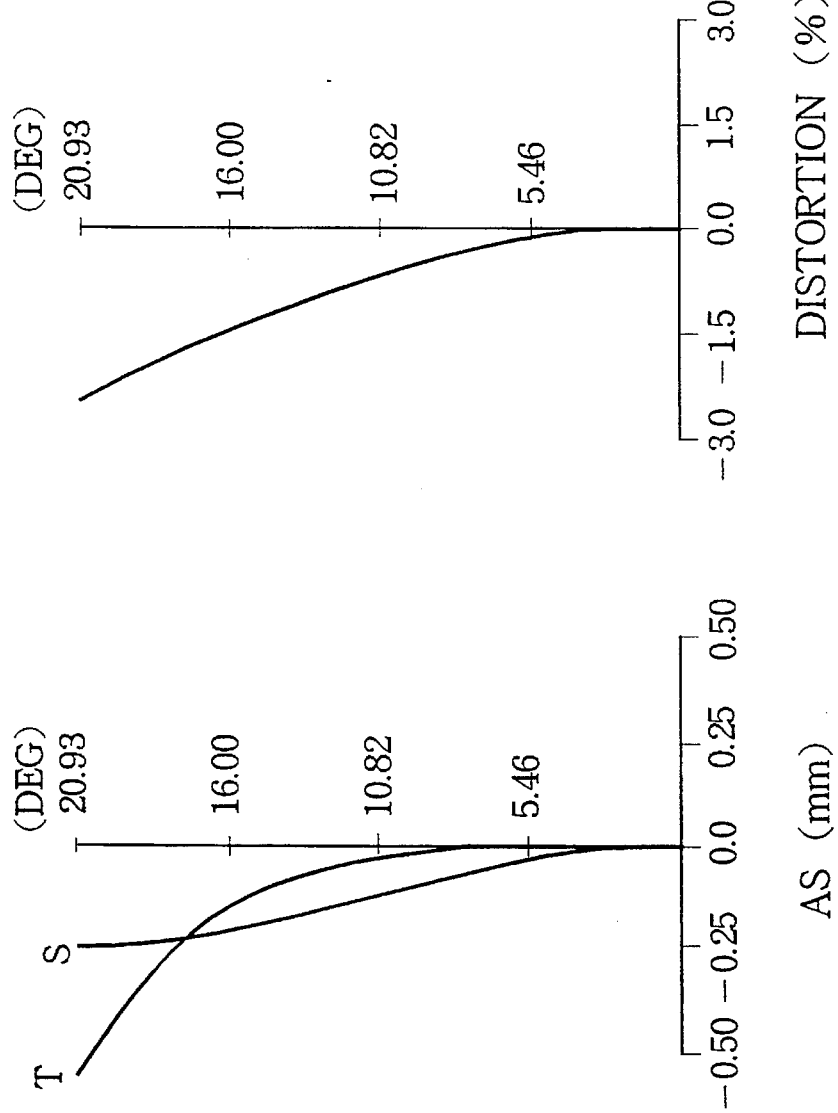
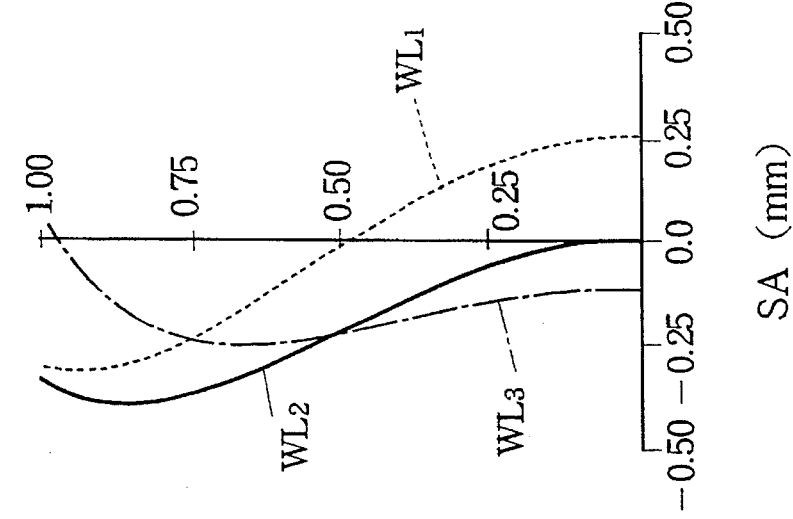

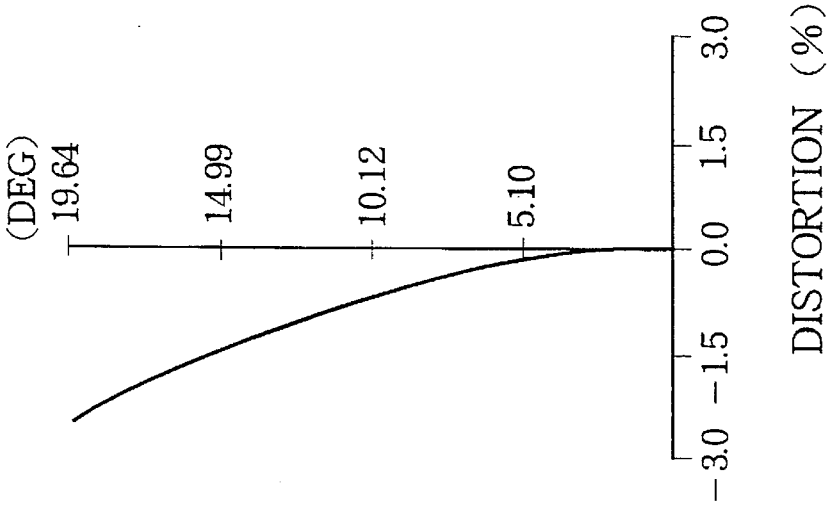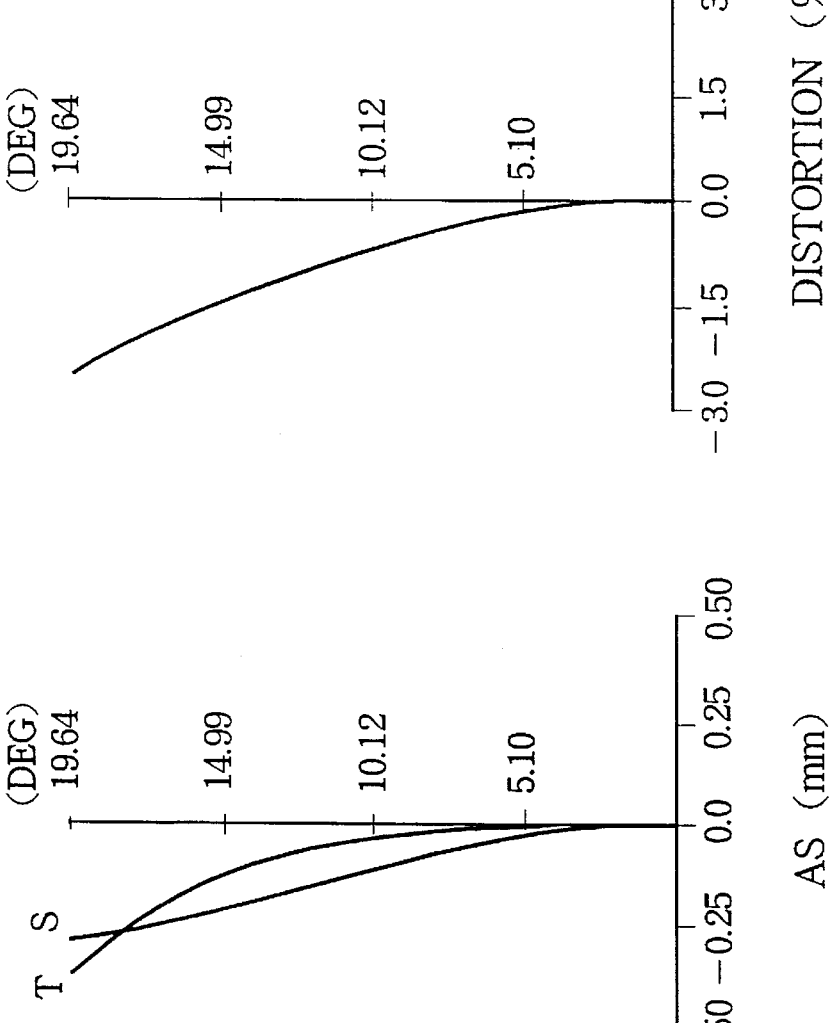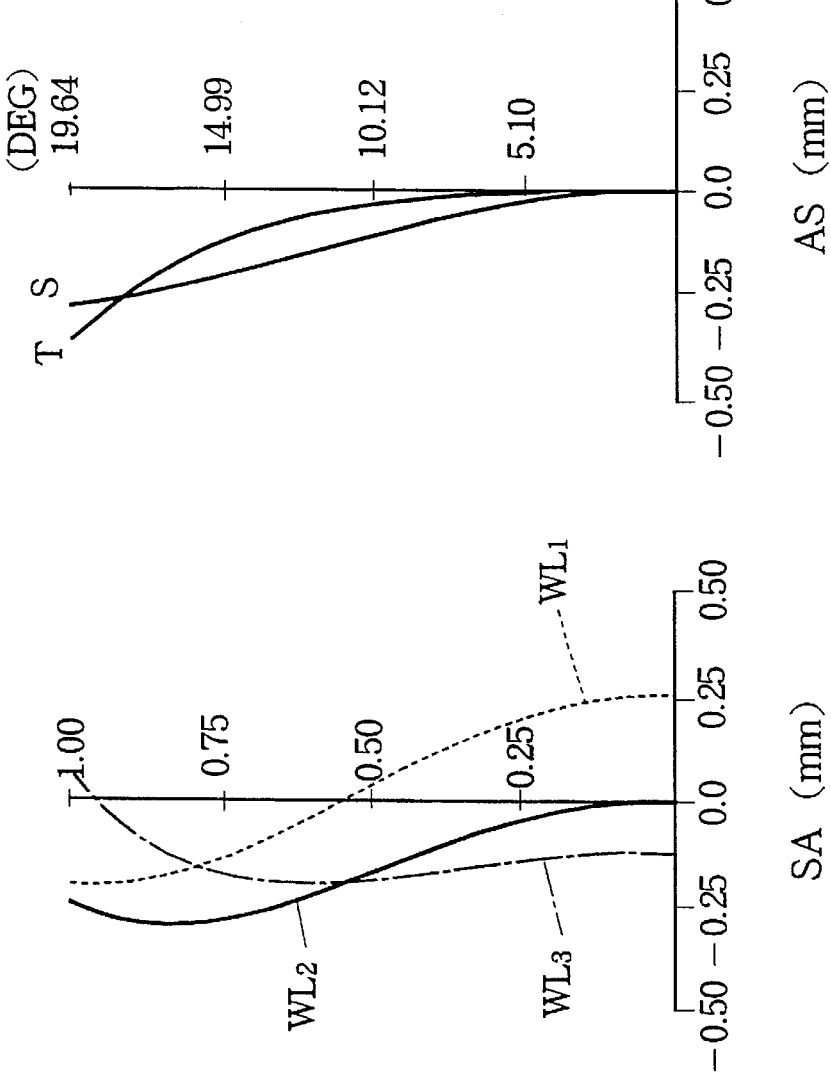

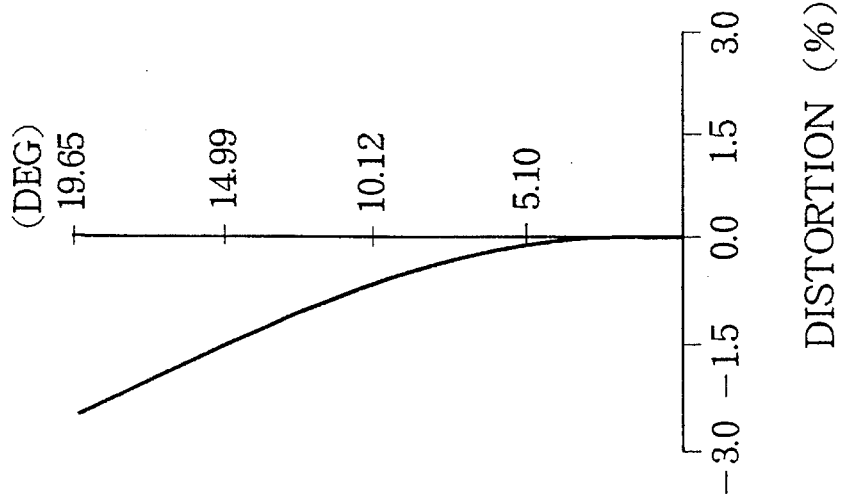
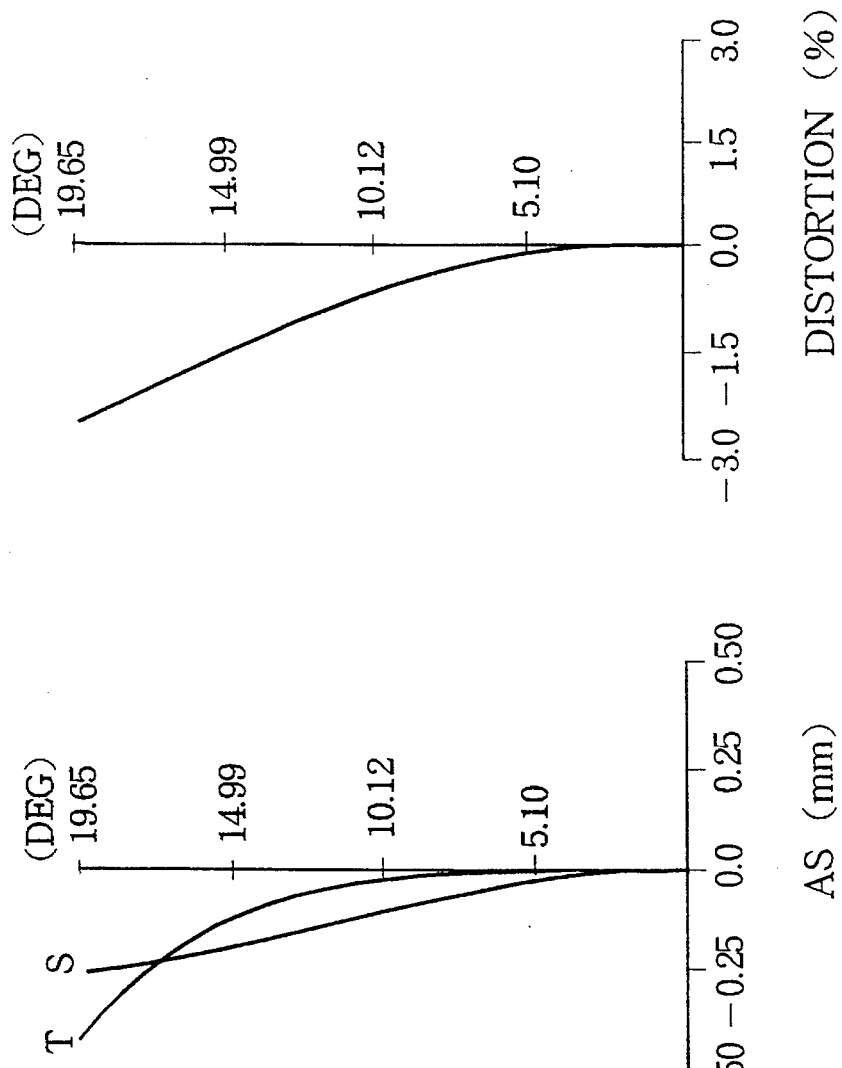
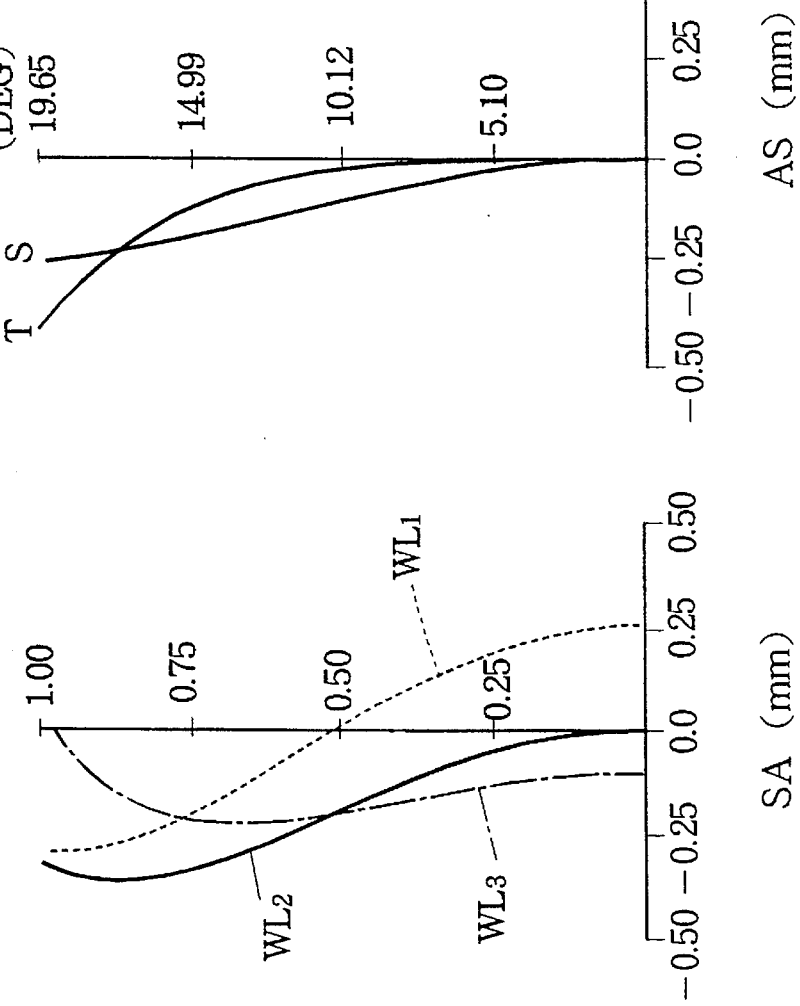

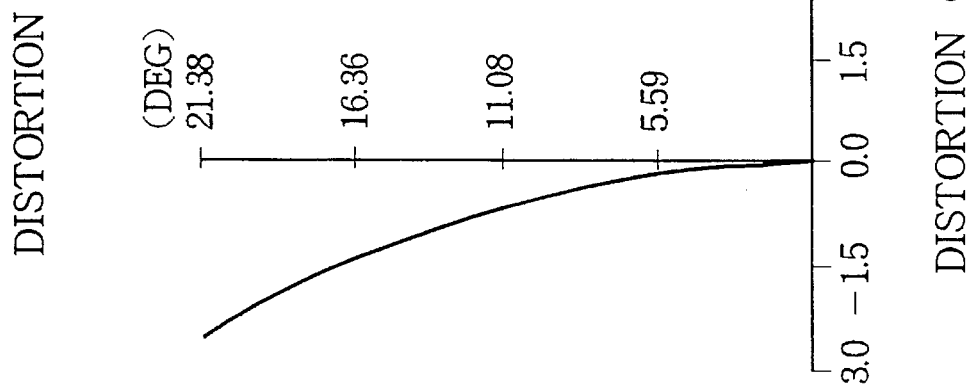
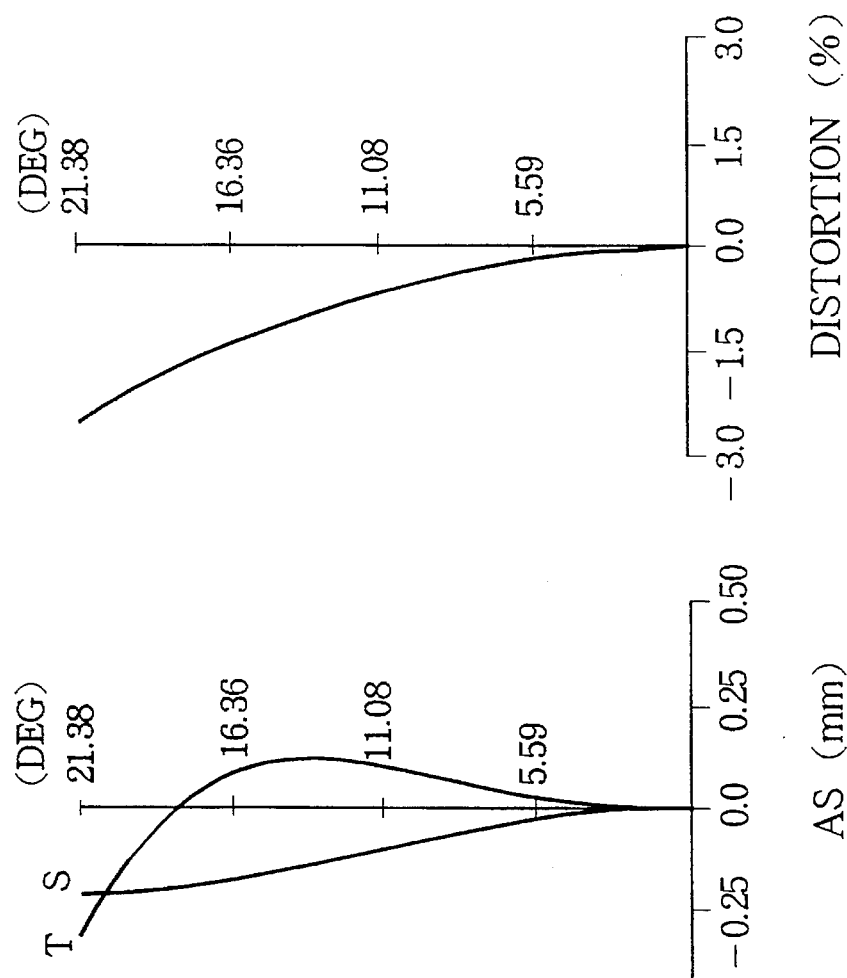
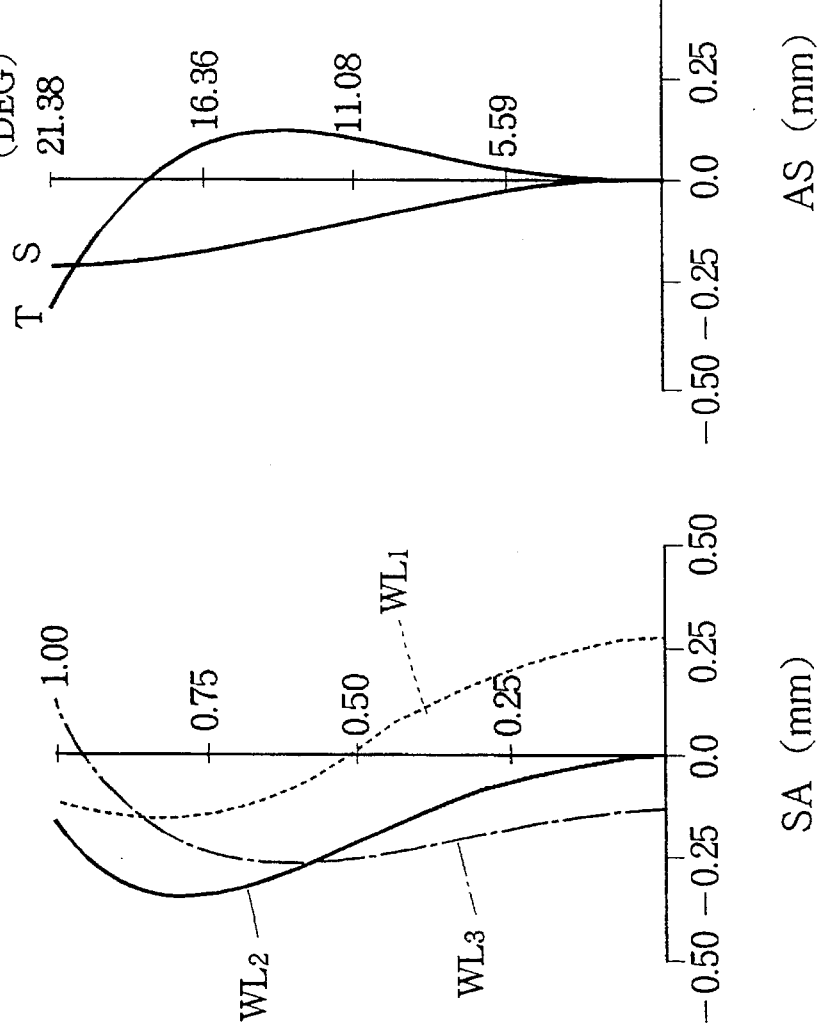

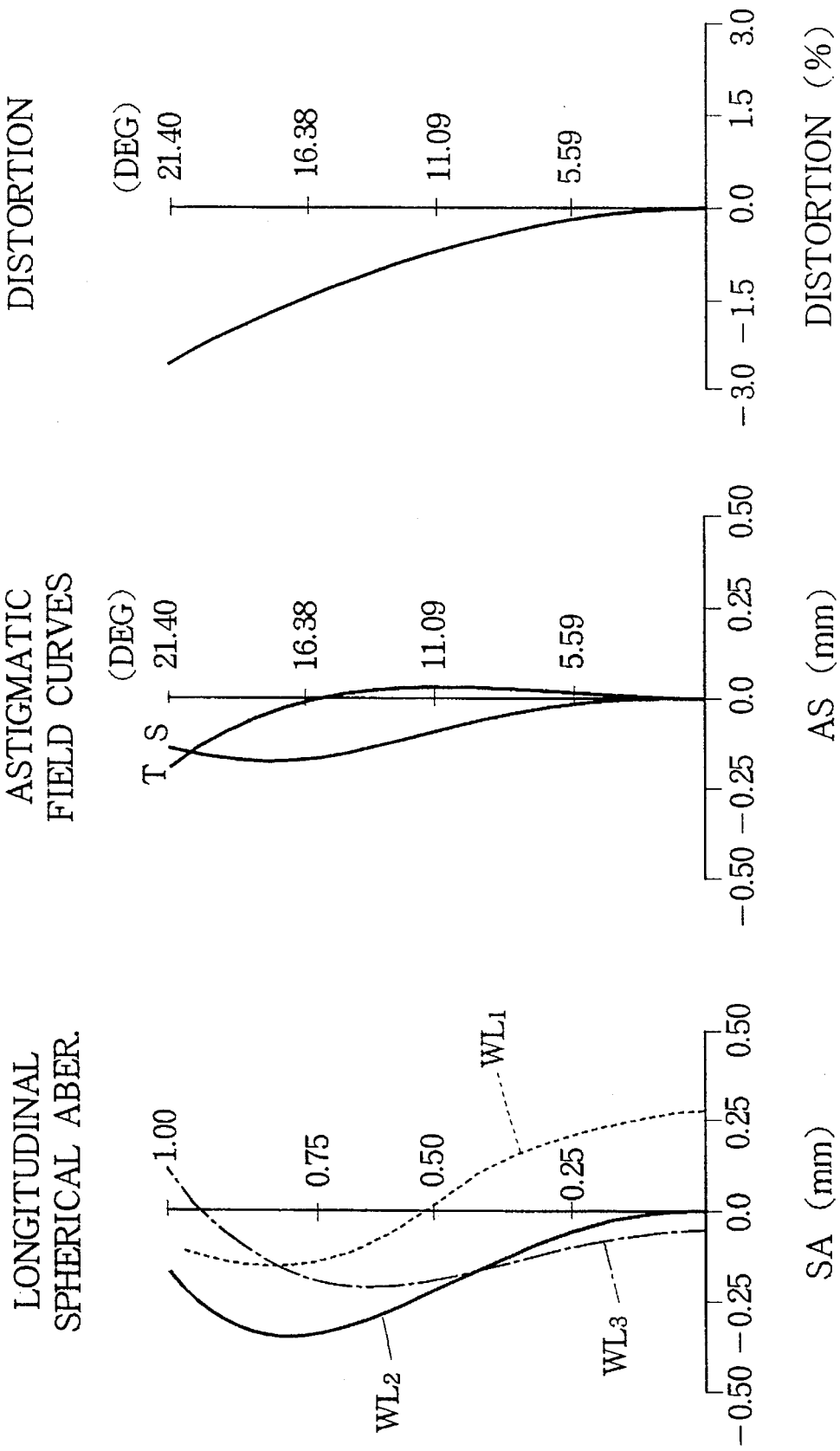

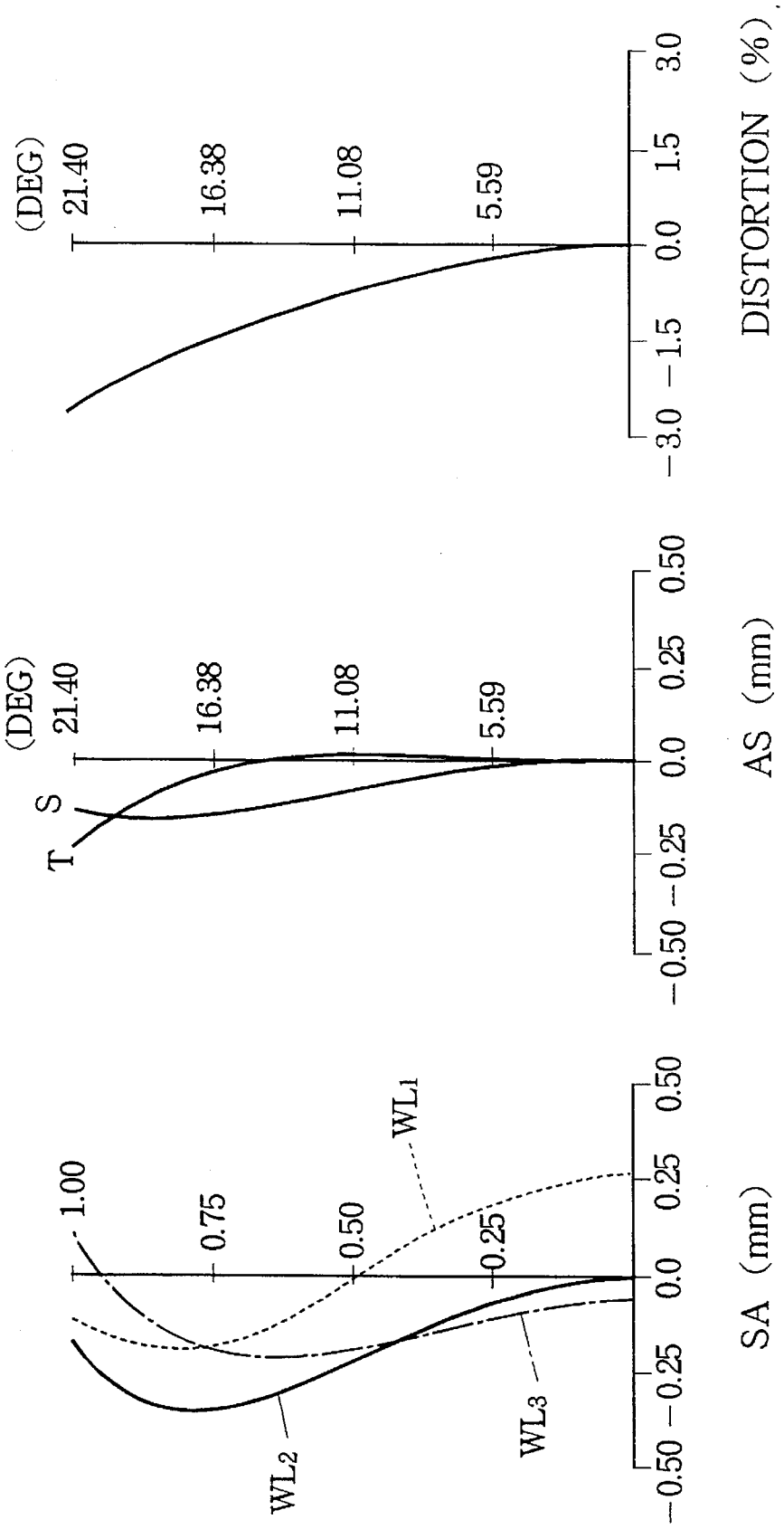

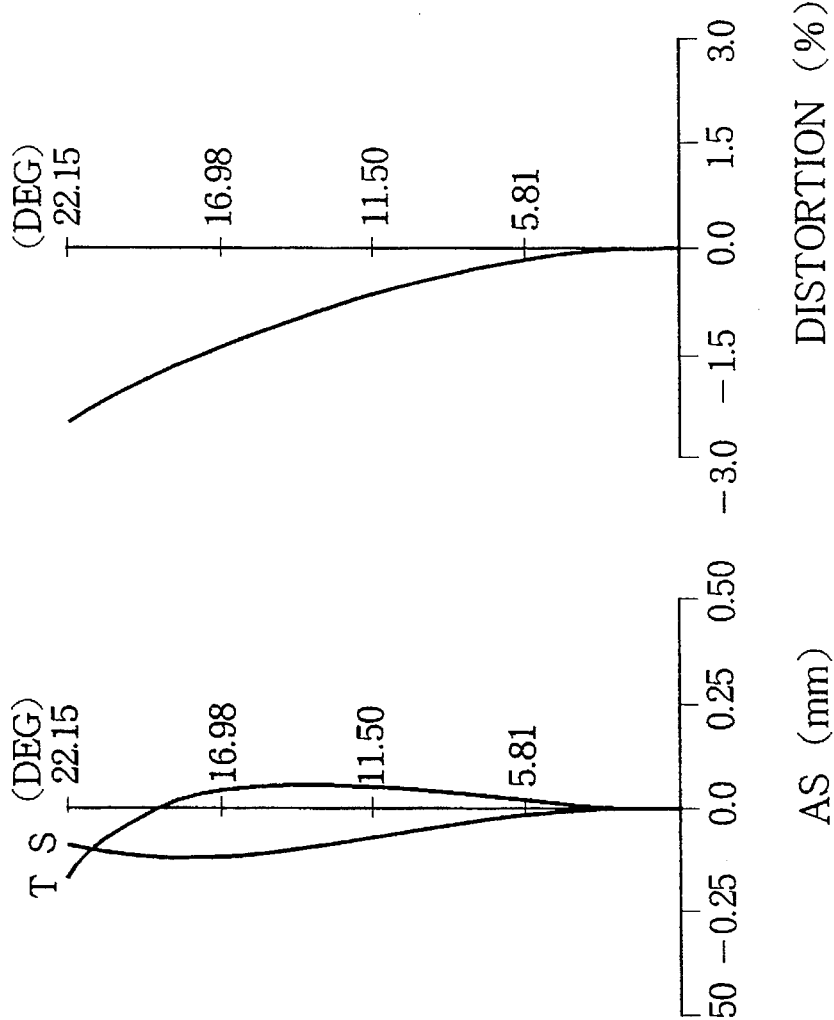

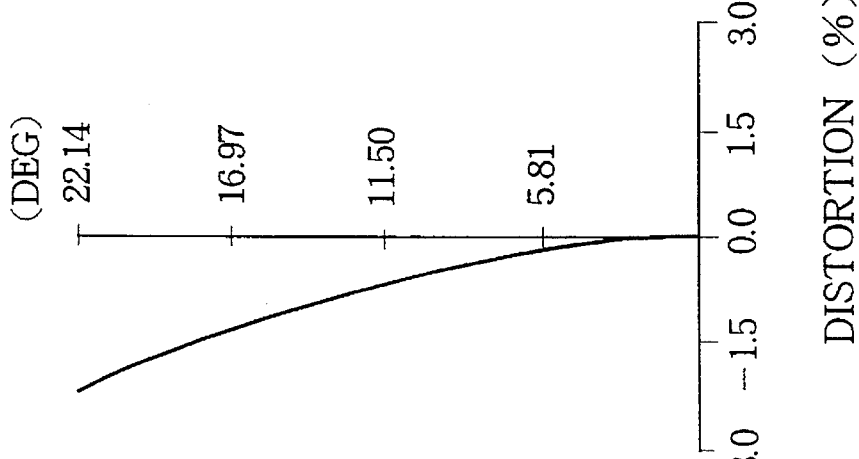
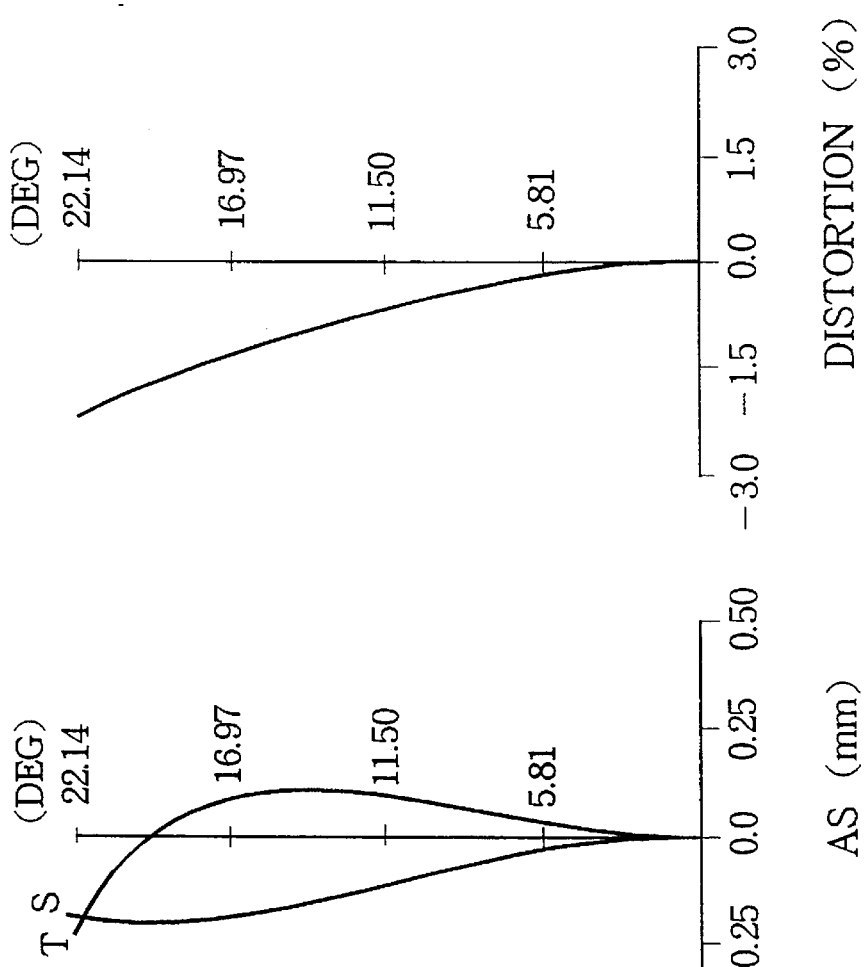
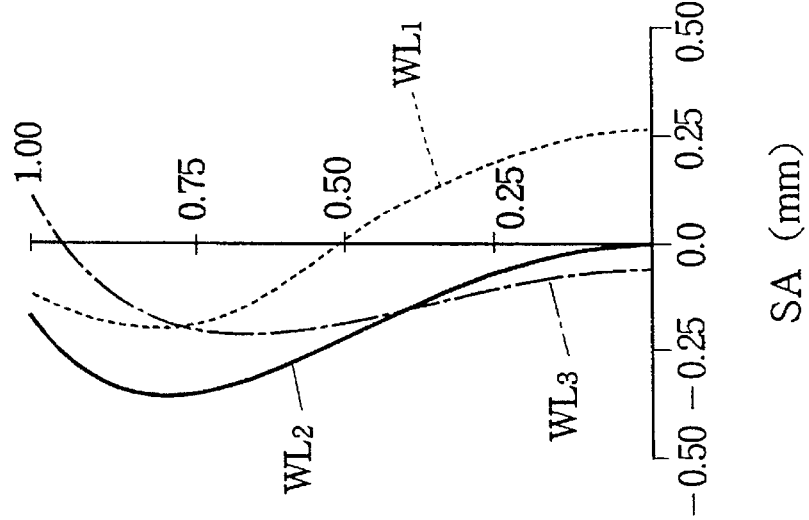

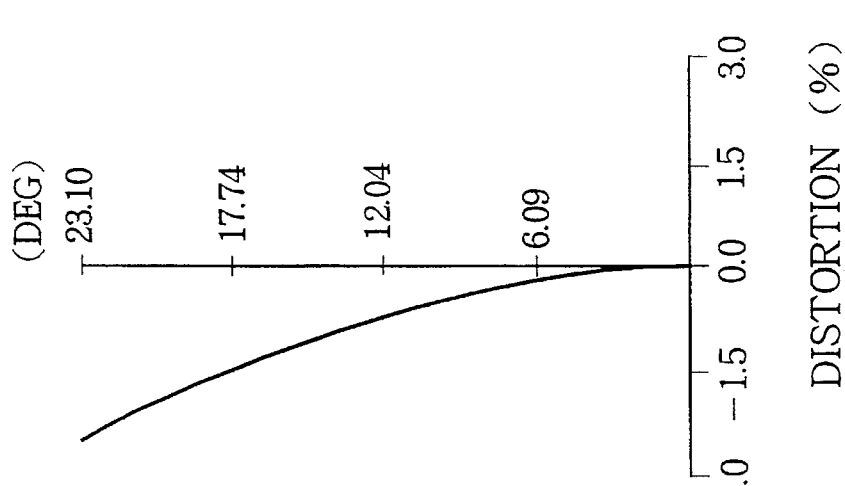
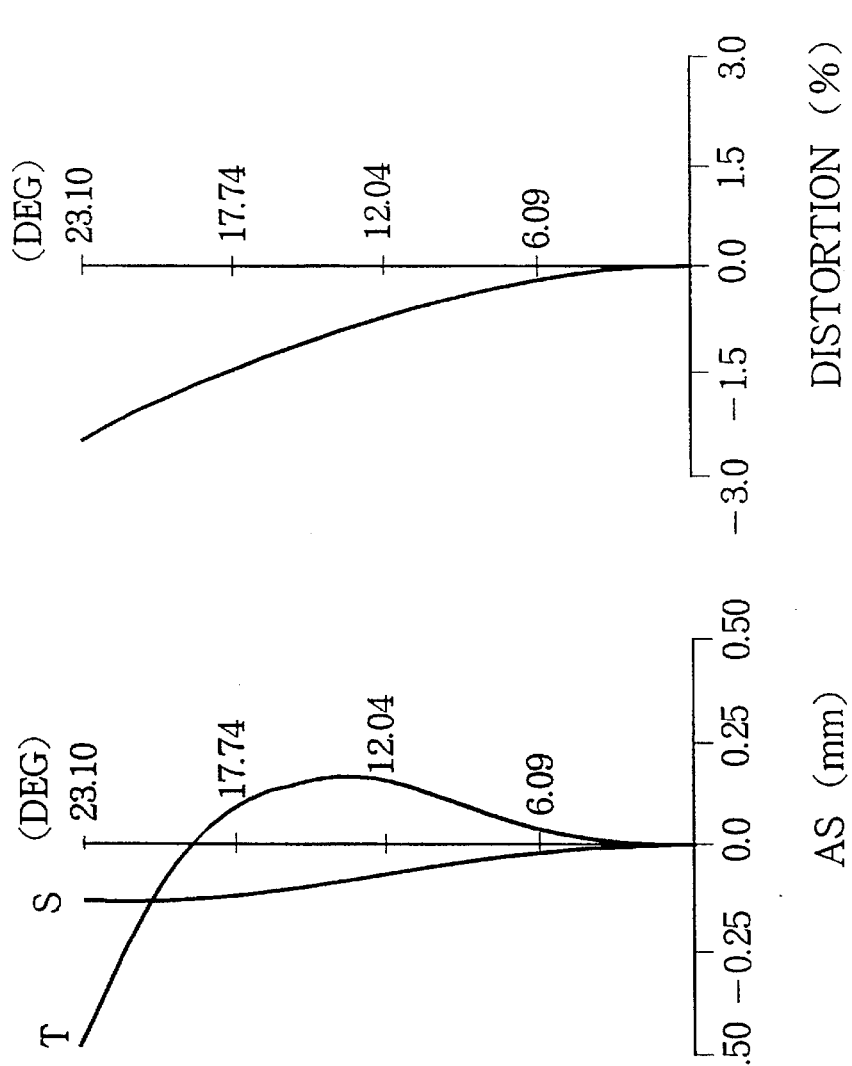
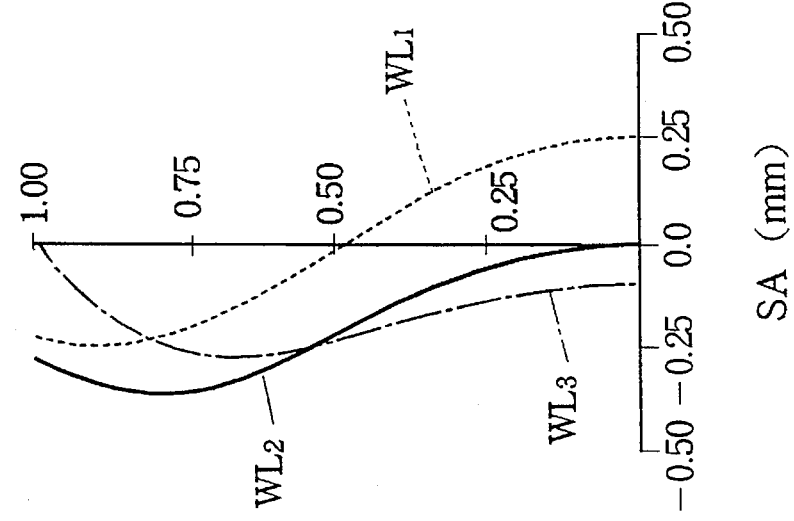

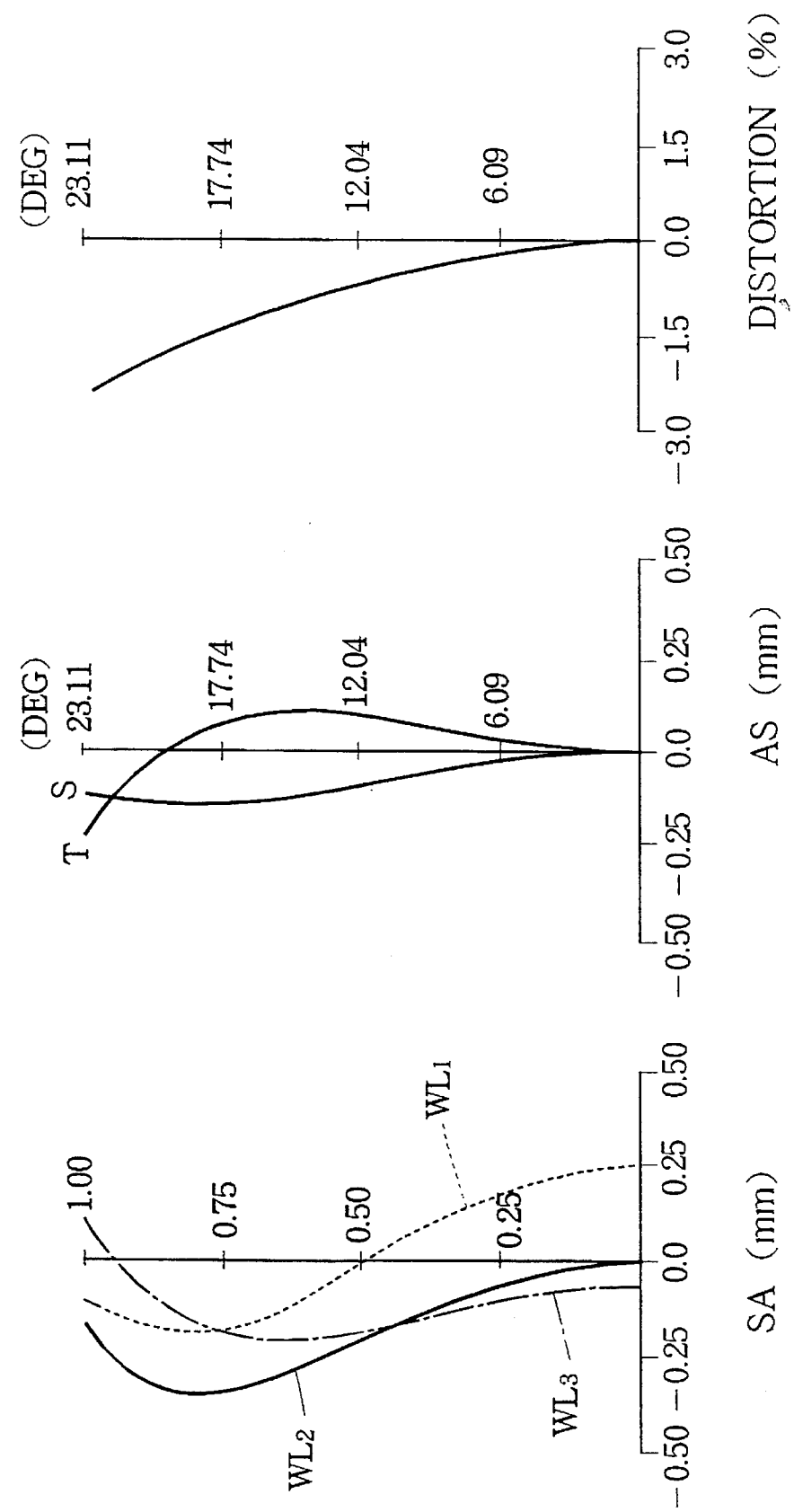

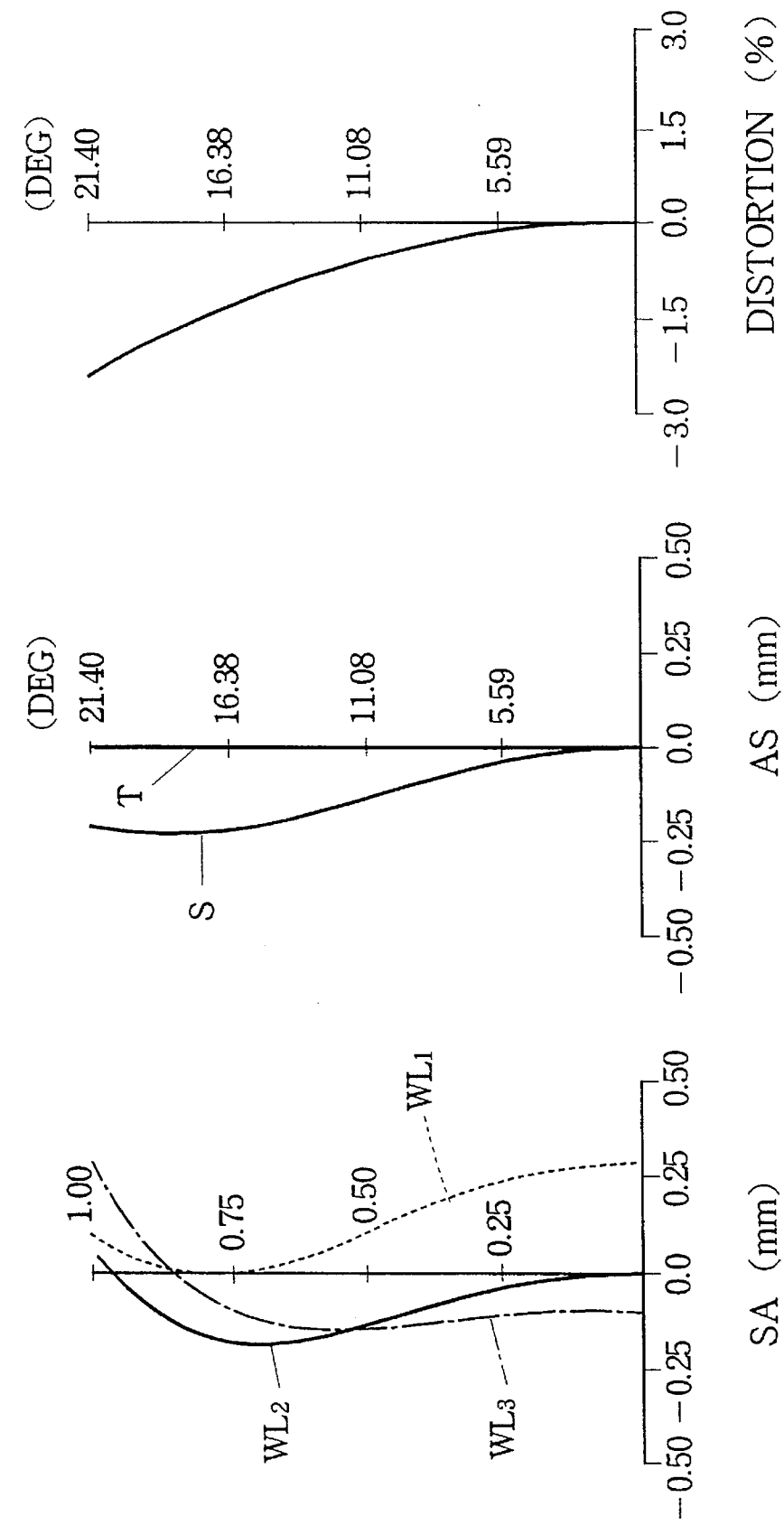

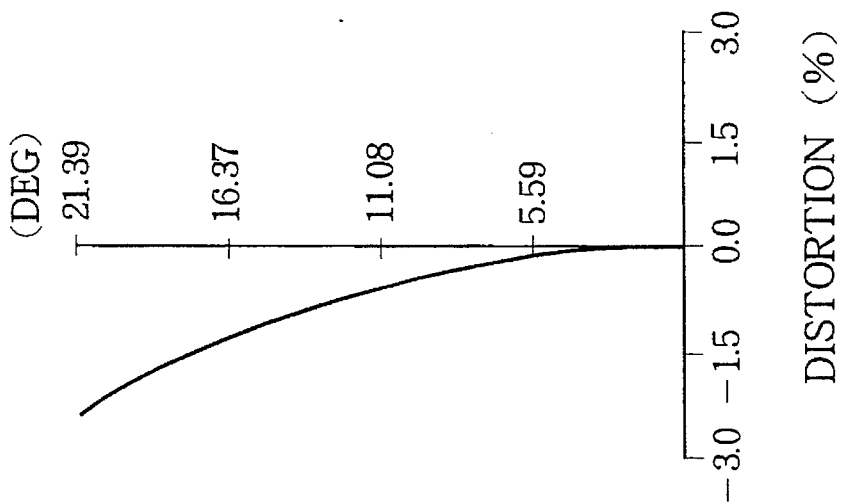
FIG.20A — LONGITUDINAL SPHERICAL ABER.
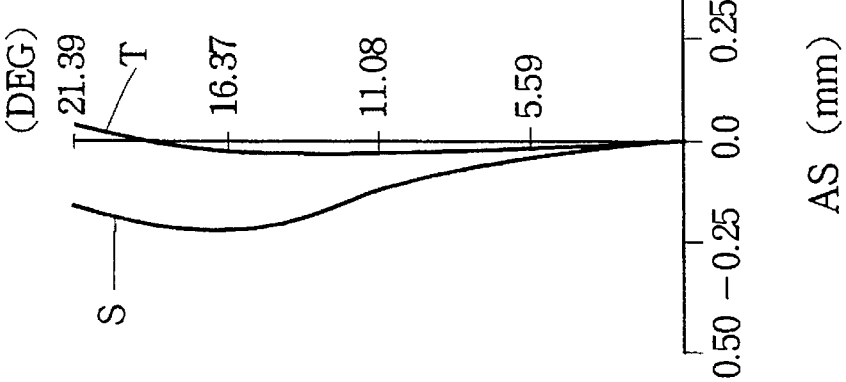
FIG.20B — ASTIGMATIC FIELD CURVES
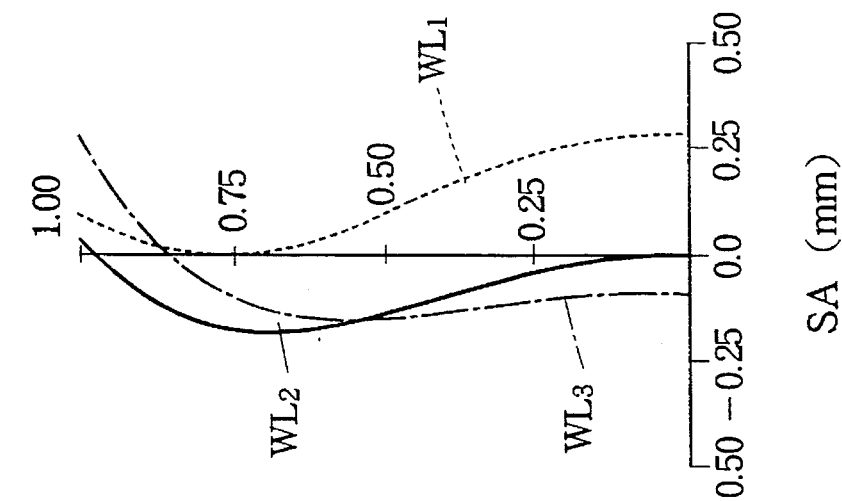
FIG.20C — DISTORTION

RETROFOCUS PROJECTION LENS

BACKGROUND OF THE INVENTION

This invention relates to a retrofocus projection lens that projects a magnified image of an image displayed on an image source onto a screen, and more particularly, to a compact and lightweight retrofocus projection lens that may be used as a liquid crystal projector to project a magnified image of an image displayed on a liquid crystal panel onto a screen.

FIG. 22 is a schematic diagram of the optical system of a conventional liquid crystal projector. In this liquid crystal projector, a light beam 20 that has emerged from a lamp 1 and been reflected by an elliptical mirror 2, is reflected by a reflecting mirror 3, and converted to a parallel beam 21 by passing through a collimator lens 4. This parallel beam 21 is split into beams of different colors 21R, 21G, 21B, which respectively pass through condensing lenses 6R, 6G, 6B so as to impinge on light valves 7R, 7G, 7B consisting of liquid crystal panels. The light beams modulated by the images formed by the liquid crystal panels are then recombined into one light beam 22 by dichroic mirrors 8G and 8GB, converted into a projecting beam 23 by a projection lens 9, and projected as a magnified color image on a screen 10. In the FIG. 22, 11 and 12 are reflecting mirrors.

A projection lens of this type for use with a liquid crystal projector is disclosed for example in Japanese Patent Kokai Publications No. 173066/1993 and No. 188287/1993. The projection lens used for the liquid crystal projector must have a long back focal length so that the color synthesizing dichroic mirrors can be inserted. It is also required that it has a high image resolving power, and that it improves distortion and magnification color aberration. It is further required that the number of the lens elements is small, the overall length of the projection lens is small and the lens diameter is small.

However, the projection lenses disclosed in these publications consist of 8 or 12 lens elements. Consequently, due to the large number of lens elements, the overall length of the projection lens was too long, and as the lens diameter also increases, it was difficult to make the projection lens small and lightweight.

A retrofocus lens comprising only 6 lens elements and having a long back focal length compared to focal length is disclosed in Japanese Patent Kokai Publication No. 49623/1974. However, this retrofocus lens is a photographic lens, and its performance characteristics such as field angle, F number and back focal length were not suitable for a liquid crystal projector.

SUMMARY OF THE INVENTION

It is therefore an object of this invention to provide a compact, lightweight retrofocus projection lens having a performance suitable for a liquid crystal projector, and consisting of 5 lens elements.

According to one aspect of the present invention, a retrofocus projection lens comprising a first lens group having a negative refracting power, a second lens group having a positive refracting power, and a third lens group having a positive refracting power. The first to third lens groups are arranged in this order from a large conjugate side. The first lens group including a convex negative meniscus lens on the large conjugate side, the second lens group including a biconvex positive lens, and the third lens group including, in order from the large conjugate side, a biconcave negative lens, a convex positive meniscus lens on a small conjugate side and a biconvex positive lens. The first to third lens groups satisfy the following relations (1) to (3):

$$0.25 < D_1/f < 0.55 \quad (1)$$

$$0.05 < f_2/f_3 < 0.4 \quad (2)$$

$$0.8 < |f_1|/f < 1.2 \quad (3)$$

where $D_1$ is air gap between the first lens group and the second lens group, $f_1$ is focal length of the first lens group, $f_2$ is focal length of the second lens group, $f_3$ is focal length of the third lens group, and f is focal length of whole lens system including the first to third lens groups.

In relation (1) that defines a ratio $D_1/f$ of the distance $D_1$ between the first and second lens groups to the overall focal length f of the system, the upper limit of 0.55 is a critical value that can maintain enough long back focal length of the projection lens, and the lower limit of 0.25 is a critical value that can maintain the required field angle. In relation (2) that defines a ratio $f_2/f_3$ of the focal lengths of the second and third lens groups, the upper limit of 0.4 is a critical value that permits correction of the off-axis aberration viewed from a small conjugate side, and the lower limit of 0.05 is a critical value that can maintain enough long back focal length. In relation (3) that defines a ratio $|f_1|/f$ of the focal length of the first lens group to the overall focal length, the upper limit of 1.2 is a critical value for permitting the back focal length to be kept enough long, and the lower limit of 0.8 is a critical value for permitting correction of the large astigmatism produced off axis. According to this invention, a projection lens can be made small and lightweight by using only five lens elements, the projection lens having an F number of at least 5.6, the half field angle being of the order of 19 to 24 degrees, and the back focal length being of the order of 1.5 times the focal length.

According to another aspect of the present invention, a retrofocus projection lens satisfies the following relation (4):

$$1.0 < r_7/f < 3.1 \quad (4)$$

where a curvature radius of a face on the small conjugate side of the biconcave negative lens in the third lens group is $r_7$.

In relation (4), the upper limit of 3.1 of $|f_1|/f$ is a critical value that does not make the negative distortion of the seventh face of the third lens of the third lens group too large, and the lower limit of 1.0 is a critical value that does not make the negative distortion produced by the sixth face of the third lens (face of the large conjugate side of the biconcave lens) too large. Due to the relation (4), distortion can be kept small.

BRIEF DESCRIPTION OF THE DRAWINGS

FIG. 1 is a diagram schematically showing the construction of a retrofocus projection lens according to Embodiment 1;

FIGS. 2A, 2B and 2C are characteristic curves showing the spherical aberration, astigmatism and distortion of Embodiment 1;

FIGS. 4A, 4B and 4C are characteristic curves showing the spherical aberration, astigmatism and distortion of Embodiment 3;

FIGS. 5A, 5B and 5C are characteristic curves showing the spherical aberration, astigmatism and distortion of Embodiment 4;

FIGS. 6A, 6B and 6C are characteristic curves showing the spherical aberration, astigmatism and distortion of Embodiment 5;

FIGS. 7A, 7B and 7C are characteristic curves showing the spherical aberration, astigmatism and distortion of Embodiment 6;

FIGS. 9A, 9B and 9C are characteristic curves showing the spherical aberration, astigmatism and distortion of Embodiment 7;

FIGS. 10A, 10B and 10C are characteristic curves showing the spherical aberration, astigmatism and distortion of Embodiment 8;

FIGS. 11A, 11B and 11C are characteristic curves showing the spherical aberration, astigmatism and distortion of Embodiment 9;

FIGS. 12A, 12B and 12C are characteristic curves showing the spherical aberration, astigmatism and distortion of Embodiment 10;

FIGS. 13A, 13B and 13C are characteristic curves showing the sperical aberration, astigmatism and distortion of Embodiment 11;

FIGS. 14A, 14B and 14C are characteristic curves showing the spherical aberration, astigmatism and distortion of Embodiment 12;

FIGS. 15A, 15B and 15C are characteristic curves showing the spherical aberration, astigmatism and distortion of Embodiment 13;

FIGS. 17A, 17B and 17C are characteristic curves showing the spherical aberration, astigmatism and distortion of Embodiment 14;

FIGS. 17A, 18B and 18C are characteristic curves showing the spherical aberration, astigmatism and distortion of Embodiment 15;

FIGS. 20A, 20B and 20C are characteristic curves showing the spherical aberration, astigmatism and distortion of Embodiment 17;

DETAILED DESCRIPTION OF THE INVENTION

Figure 3C:
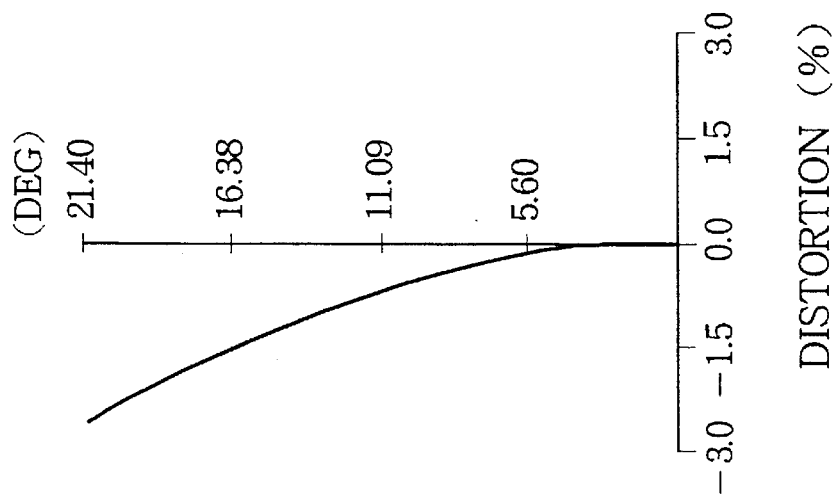
FIGS. 3A, 3B and 3C are characteristic curves showing the spherical aberration, astigmatism and distortion of Embodiment 2.

Some preferred embodiments of the retrofocus projection lens according to this invention will now be described.

Embodiment 1

FIG. 1 is a diagram schematically showing the construction of a retrofocus projection lens according to Embodiment 1 of the present invention.

As shown in FIG. 1, the projection lens according to Embodiment 1, viewed from the large conjugate side (the left-hand side of FIG. 1, which is the side of the screen, not shown), comprises a first lens group $G_1$ having a negative refracting power, a second lens group $G_2$ having a positive refracting power, and a third lens group $G_3$ having a positive refracting power. The first lens group $G_1$ comprises a concave negative meniscus lens $L_1$ on the large conjugate side, and the second lens group $G_2$ comprises a biconvex positive lens $L_2$. The third lens group $G_3$ comprises, in order from the large conjugate side, a biconcave negative lens $L_3$, together with a convex positive meniscus lens $L_4$ on the small conjugate side and a biconvex positive lens $L_5$. In the projection lens according to Embodiment 1, an aperture stop AST is also disposed between the second lens group $G_2$ and the third lens group $G_3$.

In the projection lens according to Embodiment 1:

$$0.25 < D_1/f < 0.45 \tag{5}$$

$$0.1 < f_2/f_3 < 0.4 \tag{6}$$

$$0.8 < |f_1|/f < 1.2 \tag{7}$$

where $D_1$ is the air gap between the first lens group $G_1$ and the second lens group $G_2$, $f_1$ is the focal length of the first lens group $G_1$, $f_2$ is the focal length of the second lens group $G_2$, $f_3$ is the focal length of the third lens group $G_3$, and $f$ is the focal length of the whole lens system comprising the first, second and third lens groups.

The reason why it is necessary to satisfy relation (5) defining the range of the ratio $D_1/f$ of the distance between the first lens group $G_1$ and the second lens group $G_2$ to the focal length $f$ of the whole system, is that if $D_1/f$ is too high, it is difficult to maintain the back focal length of the projection lens, the diameter of the first lens group $G_1$ increases, and the overall length of the projection lens becomes unnecessarily large. Conversely, if $D_1/f$ is too low, although it is easy to maintain the back focal length, it is difficult to keep focal length short and the required field angle cannot be obtained.

The reason why it is necessary to satisfy relation (6) defining the ratio $f_2/f_3$ of the focal lengths of the second lens group $G_2$ and third lens group $G_3$, is that if $f_2/f_3$ is too high, the refracting power of the third lens group becomes too strong compared to that of the second lens group and considerable off-axis aberration is produced when viewed from the small conjugate side that is difficult to correct. On the other hand, if $f_2/f_3$ is too small, the refracting power of the third lens group becomes too weak compared to that of the second lens group, the performance by the retrofocus arrangement is weak, and it is difficult to keep the back focal length long.

The reason why it is necessary to satisfy relation (7) defining the ratio $|f_1|/f$ of the focal length of the first lens group $G_1$ with respect to that of the whole system, is that if $|f_1|/f$ is too large, the negative refracting power of the first lens group is too weak, the performance of the retrofocus arrangement is weak and it is difficult to keep the back focal length long. Conversely, if $|f_1|/f$ is too small, the negative refracting power of the first lens group is too strong, and considerable off-axis astigmatism is produced that is difficult to correct.

Further, the projection lens of Embodiment 1 is so arranged as to satisfy the following relation:

$$1.4 < r_r/f < 3.1 \tag{8}$$

so that distortion can be suitably controlled.

Relation (8) indicates that one factor controlling the amount of distortion of the whole projection lens system is the seventh face $r_7$ of the lens $L_3$. Relation (8) permits the distortion of the whole system to be suppressed to a minimum by limiting the radius of curvature of the seventh face $r_7$ of the lens $L_3$ to be within a certain range. The reason why it is necessary to satisfy relation (8) is that, if $r_7/f$ is too large, negative distortion of the total lens system becomes too large. Conversely, if $r_7/f$ is too small, the positive distortion produced by the seventh face $r_7$ becomes even larger, but the negative distortion produced by the sixth face $r_6$ (face on the large conjugate side of the biconcave lens $L_3$) is excessive, and other off-axis aberration increases.

FIG. 2 is a characteristic curve showing the spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the projection lens of Embodiment 1 is viewed from the small conjugate side.

Table 1 below shows a specific arrangement of the projection lens of Embodiment 1. The symbols in the table have the following significance. Focal length, magnification and back focal length are values with respect to the e line.

f: focal length of whole projection lens system
θ: projection half field angle (large conjugate side)
F: effective F number on small conjugate side at standard projection magnification
M: standard projection magnification
$f_1$: focal length of first lens group $G_1$
$f_2$: focal length of second lens group $G_2$
$f_3$: focal length of third lens group $G_3$
$D_1$: air gap between first lens group $G_1$ and second lens group $G_2$
BF: back focal length at standard projection magnification
m: face number counted in sequence from screen side
$r_i$: curvature radius of i-th lens face counted from screen side
$d_i$: thickness and air gap of i-th lens element counted from screen side
$n_i$: refractive index of i-th lens counted from screen side (587.6 [nm]) (d line)
$v_i$: Abbe number of i-th lens element counted from screen side
AST: aperture stop

TABLE 1

| f = 135.00 | θ = 21.41° | F = 5.60 | M = 31.65 |
|---|---|---|---|
| $f_1$ = −120.31 | $f_2$ = 91.29 | $f_3$ = 590.40 | |
| $D_1$ = 52.87 | BF = 206.99 | | |
| $f_1/f$ = −0.89 | $f_2/f_3$ = 0.15 | | |
| $D_1/f$ = 0.39 | $r_7/f$ = 1.55 | | |

| m | $r_i$ | $d_i$ | $n_i$ | $v_i$ | |
|---|---|---|---|---|---|
| 1: | 249.24137 | 3.40 | 1.620408 | 60.34 | |
| 2: | 57.31088 | 52.87 | | | |
| 3: | 91.21153 | 8.62 | 1.639803 | 34.57 | |
| 4: | −159.38890 | 17.23 | | | |
| 5: | INFINITY | 6.64 | | | AST |
| 6: | −64.05894 | 21.00 | 1.784715 | 25.70 | |
| 7: | 209.00740 | 4.45 | | | |
| 8: | −118.93920 | 6.06 | 1.620408 | 60.34 | |
| 9: | −68.32664 | 0.30 | | | |
| 10: | 927.46606 | 9.43 | 1.677901 | 55.52 | |
| 11: | −78.03363 | | | | |

As described hereinbefore, according to Embodiment 1, a projection lens having an F number of at least 5.6, a half field angle of approx. 19 to 22 and a back focal length of approx. 1.5 times the focal length may be constructed from only 5 lens elements, thereby achieving compactness and light-weightness of the projection lens.

In the above description, the case has been described wherein the diameter of the aperture stop AST is not variable. However, by using a blade stop of the type employed in a camera lens, the diameter of the aperture stop AST can be made variable so that the effective F value can be varied. In this case, the brightness of the image projected by the liquid crystal projector may be controlled by varying the diameter of the aperture stop AST.

Further, if a polymer dispersed liquid crystal (PDLC) or a dynamic scattering mode liquid crystal (DSM-LC) is used as the liquid crystal light valve, the proportion of scattered light removed may be adjusted according to the diameter of the aperture stop AST so that brightness and contrast of the projected image can be varied.

Embodiment 2

Figure 3B:
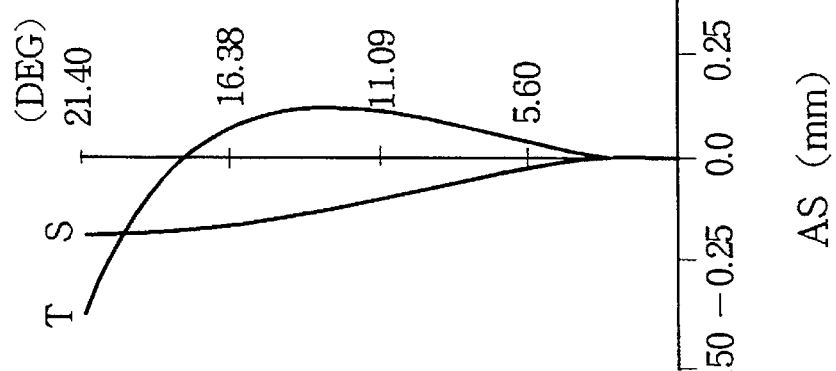
Figure 3A:
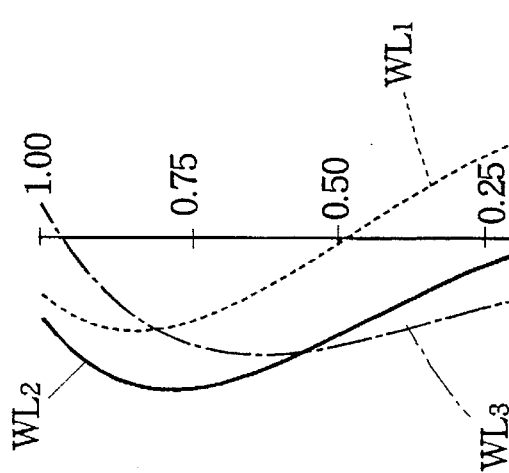

FIGS. 3A, 3B and 3C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 2 is viewed from the small conjugate side.

As in the case of projection lens shown in FIG. 1 (Embodiment 1), the retrofocus projection lens of Embodiment 2 comprises five lens elements $L_1$ to $L_5$ and an aperture stop AST. Specific examples of the retrofocus projection lens of Embodiment 2 are as shown in Table 2 below. The symbols in Table 2 have the same significance as those in Embodiment 1.

TABLE 2

| f = 135.00 | θ = 21.40° | F = 5.60 | M = 31.65 |
|---|---|---|---|
| $f_1$ = −120.83 | $f_2$ = 93.72 | $f_3$ = 443.27 | |
| $D_1$ = 48.19 | BF = 206.00 | | |
| $f_1/f$ = −0.90 | $f_2/f_3$ = 0.21 | | |
| $D_1/f$ = 0.36 | $r_7/f$ = 1.54 | | |

| m | $r_i$ | $d_i$ | $n_i$ | $v_i$ | |
|---|---|---|---|---|---|
| 1: | 279.56035 | 3.40 | 1.648497 | 53.03 | |
| 2: | 61.12351 | 48.19 | | | |
| 3: | 96.11153 | 12.36 | 1.647693 | 33.84 | |
| 4: | −159.38890 | 20.36 | | | |
| 5: | INFINITY | 5.07 | | | AST |
| 6: | −57.35157 | 21.00 | 1.755198 | 27.53 | |
| 7: | 207.92378 | 3.83 | | | |
| 8: | −92.01524 | 6.06 | 1.620408 | 60.34 | |
| 9: | −59.14104 | 0.30 | | | |
| 10: | 295.05825 | 9.43 | 1.589178 | 61.25 | |
| 11: | −70.99652 | | | | |

The retrofocus projection lens of Embodiment 2 also satisfies the aforesaid relations (5) to (8), hence the same effect is obtained as in Embodiment 1. Embodiment 2 is the same in other respects as Embodiment 1.

Embodiment 3

FIGS. 4A, 4B and 4C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 3 is viewed from the small conjugate side.

As in the case of projection lens shown in FIG. 1 (Embodiment 1), the retrofocus projection lens of Embodiment 3 comprises five lens elements $L_1$ to $L_5$ and an aperture stop AST. Specific examples of the retrofocus projection lens of Embodiment 3 are as shown in Table 3 below. The symbols in Table 3 have the same significance as those in Embodiment 1.

TABLE 3

| f = 135.00 | θ = 20.93° | F = 5.60 | M = 31.65 |
|---|---|---|---|
| $f_1$ = −116.80 | $f_2$ = 94.75 | $f_3$ = 376.84 | |
| $D_1$ = 44.71 | BF = 207.00 | | |
| $f_1/f$ = −0.87 | $f_2/f_3$ = 0.25 | | |
| $D_1/f$ = 0.33 | $r_7/f$ = 1.76 | | |

| m | $r_i$ | $d_i$ | $n_i$ | $v_i$ | |
|---|---|---|---|---|---|
| 1: | 293.81345 | 3.20 | 1.648497 | 53.03 | |
| 2: | 60.17323 | 44.71 | | | |
| 3: | 98.51502 | 9.67 | 1.647693 | 33.84 | |
| 4: | −159.38890 | 21.82 | | | |
| 5: | INFINITY | 5.21 | | | AST |
| 6: | −56.20182 | 21.00 | 1.755198 | 27.53 | |
| 7: | 236.93186 | 3.61 | | | |
| 8: | −96.23521 | 6.06 | 1.620408 | 60.34 | |
| 9: | −58.86392 | 0.30 | | | |
| 10: | 325.86812 | 9.43 | 1.589128 | 61.25 | |
| 11: | −70.55662 | | | | |

The retrofocus projection lens of Embodiment 3 also satisfies the aforesaid relations (5) to (8), hence the same effect is obtained as in Embodiment 1. Embodiment 3 is the same in other respects as Embodiment 1.

Embodiment 4

FIGS. 5A, 5B and 5C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 4 is viewed from the small conjugate side.

As in the case of projection lens shown in FIG. 1 (Embodiment 1), the retrofocus projection lens of Embodiment 4 comprises five lens elements $L_1$ to $L_5$ and an aperture stop AST. Specific examples of the retrofocus projection lens of Embodiment 4 are as shown in Table 4 below. The symbols in Table 4 have the same significance as those in Embodiment 1.

TABLE 4

| f = 135.00 | θ = 20.93° | F = 5.60 | M = 31.65 |
|---|---|---|---|
| $f_1$ = −136.94 | $f_2$ = 108.52 | $f_3$ = 315.10 | |
| $D_1$ = 47.86 | BF = 207.00 | | |
| $f_1/f$ = −1.01 | $f_2/f_3$ = 0.34 | | |
| $D_1/f$ = 0.35 | $r_7/f$ = 2.62 | | |

| m | $r_i$ | $d_i$ | $n_i$ | $v_i$ | |
|---|---|---|---|---|---|
| 1: | 279.54124 | 3.20 | 1.516798 | 64.20 | |
| 2: | 56.41875 | 47.86 | | | |
| 3: | 124.91878 | 7.63 | 1.647693 | 33.84 | |
| 4: | −159.38890 | 22.28 | | | |
| 5: | INFINITY | 4.19 | | | AST |
| 6: | −56.39065 | 21.00 | 1.755198 | 27.53 | |
| 7: | 353.65763 | 3.06 | | | |
| 8: | −101.64939 | 6.06 | 1.620408 | 60.34 | |
| 9: | −59.48990 | 0.30 | | | |
| 10: | 568.32422 | 9.43 | 1.603110 | 60.69 | |
| 11: | −70.31433 | | | | |

The retrofocus projection lens of Embodiment 4 also satisfies the aforesaid relations (5) to (8), hence the same effect is obtained as in Embodiment 1. Embodiment 4 is the same in other respects as Embodiment 1.

Embodiment 5

FIGS. 6A, 6B and 6C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 5 is viewed from the small conjugate side.

As in the case of projection lens shown in FIG. 1 (Embodiment 1), the retrofocus projection lens of Embodiment 5 comprises five lens elements $L_1$ to $L_5$ and an aperture stop AST. Specific examples of the retrofocus projection lens of Embodiment 5 are as shown in Table 5 below. The symbols in Table 5 have the same significance as those in Embodiment 1.

TABLE 5

| f = 135.00 | θ = 19.64° | F = 5.60 | M = 31.65 |
|---|---|---|---|
| $f_1$ = −125.87 | $f_2$ = 105.57 | $f_3$ = 296.64 | |
| $D_1$ = 41.36 | BF = 206.99 | | |
| $f_1/f$ = −0.93 | $f_2/f_3$ = 0.36 | | |
| $D_1/f$ = 0.31 | $r_7/f$ = 2.25 | | |

| m | $r_i$ | $d_i$ | $n_i$ | $v_i$ | |
|---|---|---|---|---|---|
| 1: | 349.95117 | 3.20 | 1.516798 | 64.20 | |
| 2: | 54.85411 | 41.36 | | | |
| 3: | 117.31998 | 13.01 | 1.647693 | 33.84 | |
| 4: | −159.38890 | 20.21 | | | |
| 5: | INFINITY | 4.43 | | | AST |
| 6: | −58.33444 | 21.00 | 1.755198 | 27.53 | |
| 7: | 304.34759 | 3.00 | | | |
| 8: | −104.98636 | 6.06 | 1.620408 | 60.34 | |
| 9: | −61.43134 | 0.30 | | | |
| 10: | 415.42322 | 9.43 | 1.603110 | 60.69 | |
| 11: | −70.57545 | | | | |

The retrofocus projection lens of Embodiment 5 also satisfies the aforesaid relations (5) to (8), hence the same effect is obtained as in Embodiment 1. Embodiment 5 is the same in other respects as Embodiment 1.

Embodiment 6

FIGS. 7A, 7B and 7C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 6 is viewed from the small conjugate side.

As in the case of projection lens shown in FIG. 1 (Embodiment 1), the retrofocus projection lens of Embodiment 6 comprises five lens elements $L_1$ to $L_5$ and an aperture stop AST. Specific examples of the retrofocus projection lens of Embodiment 6 are as shown in Table 6 below. The symbols in Table 6 have the same significance as those in Embodiment 1.

TABLE 6

| f = 135.00 | θ = 19.65° | F = 5.60 | M = 31.65 |
|---|---|---|---|
| $f_1$ = −127.33 | $f_2$ = 107.93 | $f_3$ = 278.35 | |
| $D_1$ = 40.15 | BF = 206.98 | | |
| $f_1/f$ = −0.94 | $f_2/f_3$ = 0.39 | | |
| $D_1/f$ = 0.30 | $r_7/f$ = 2.91 | | |

| m | $r_i$ | $d_i$ | $n_i$ | $v_i$ | |
|---|---|---|---|---|---|
| 1: | 391.90441 | 3.20 | 1.516798 | 64.20 | |
| 2: | 56.36343 | 40.15 | | | |
| 3: | 122.03749 | 12.94 | 1.647693 | 33.84 | |
| 4: | −159.38890 | 18.84 | | | |
| 5: | INFINITY | 7.06 | | | AST |
| 6: | −56.03499 | 21.00 | 1.755198 | 27.53 | |
| 7: | 392.50778 | 3.02 | | | |
| 8: | −108.54161 | 6.06 | 1.620408 | 60.34 | |
| 9: | −60.32807 | 0.30 | | | |
| 10: | 491.81893 | 9.43 | 1.603110 | 60.69 | |
| 11: | −71.27519 | | | | |

The retrofocus projection lens of Embodiment 6 also satisfies the aforesaid relations (5) to (8), hence the same effect is obtained as in Embodiment 1. Embodiment 6 is the same in other respects as Embodiment 1.

Embodiment 7

Figure 8:
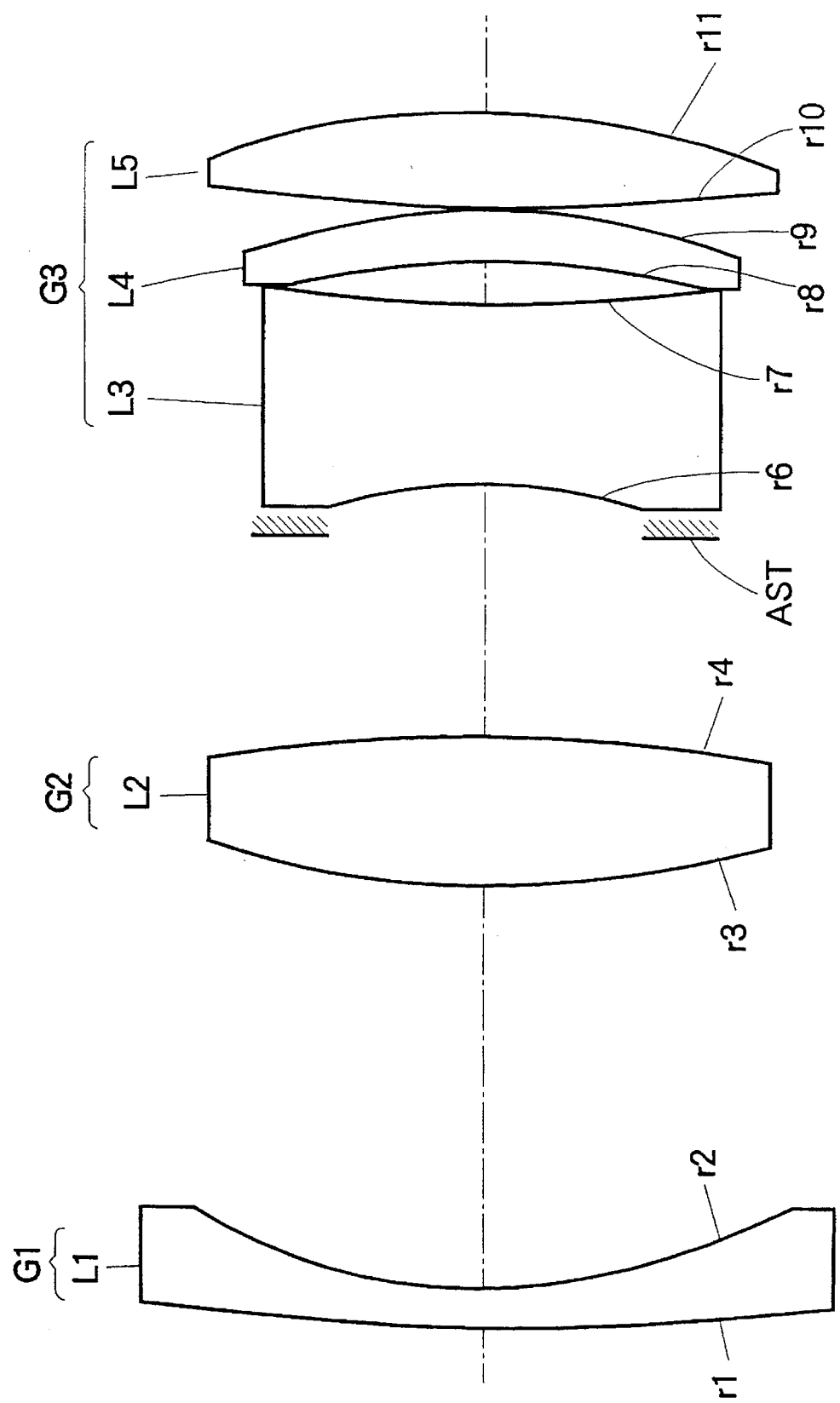
FIG. 8 is a diagram schematically showing the construction of a retrofocus projection lens according to Embodiment 7.

FIG. 8 is a diagram schematically showing the construction of a retrofocus projection lens according to a Embodiment 7. In FIG. 8, parts identical to those of FIG. 1 are given the same numerals, and their description is omitted.

In the projection lens according to Embodiment 7:

$$0.25 < D_1/f < 0.55 \qquad (9)$$

$$0.05 < f_2/f_3 < 0.25 \qquad (10)$$

$$0.8 < |f_1|/f < 1.2 \qquad (11)$$

where $D_1$ is the air gap between the first lens group $G_1$ and the second lens group $G_2$, $f_1$ is the focal length of the first lens group $G_1$, $f_2$ is the focal length of the second lens group $G_2$, $f_3$ is the focal length of the third lens group $G_3$, and f is the focal length of the whole lens system comprising the first, second and third lens groups.

The reasons why the above relations (9), (10), (11) must be satisfied are the same as the reasons why the above relations (5), (6), (7), described hereinbefore in Embodiment 1, must be satisfied.

Further, in addition to the above relations (9), (10), (11), the retrofocus projection lens of Embodiment 7 satisfies the following relation (12):

$$1.4 < r_7/f < 1.8 \qquad (12)$$

The reason why it is necessary to satisfy relation (12) is the same as the reason why it is necessary to satisfy the above relation (8) in Embodiment 1.

FIGS. 9A, 9B and 9C are characteristic curves showing the spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 7 is viewed from the small conjugate side.

Specific examples of the retrofocus projection lens of Embodiment 7 are as shown in Table 7 below. The symbols in Table 7 have the same significance as those in Embodiment 1.

TABLE 7

| f = 135.10 | θ = 21.38° | F = 5.60 | M = 31.65 |
|---|---|---|---|
| $f_1$ = −117.30 | $f_2$ = 93.25 | $f_3$ = 446.11 | |
| $D_1$ = 46.89 | BF = 205.00 | | |
| $f_1/f$ = −0.87 | $f_2/f_3$ = 0.21 | | |
| $D_1/f$ = 0.35 | $r_7/f$ = 1.53 | | |

| m | $r_i$ | $d_i$ | $n_i$ | $v_i$ | |
|---|---|---|---|---|---|
| 1: | 276.09796 | 3.40 | 1.658435 | 50.85 | |
| 2: | 60.27637 | 46.89 | | | |
| 3: | 94.55475 | 15.57 | 1.647693 | 33.84 | |
| 4: | −159.38890 | 20.23 | | | |
| 5: | INFINITY | 5.40 | | | AST |
| 6: | −57.09017 | 19.00 | 1.755198 | 27.53 | |
| 7: | 207.28430 | 3.72 | | | |
| 8: | −91.54477 | 6.06 | 1.622994 | 58.12 | |
| 9: | −58.70194 | 0.30 | | | |
| 10: | 288.88964 | 9.43 | 1.589178 | 61.25 | |
| 11: | −70.37761 | | | | |

The retrofocus projection lens according to Embodiment 7 satisfies the above relations (9) to (12). A projection lens having an F number of at least 5.6, a half field angle of approx. 20 to 24 and a back focal length of approx. 1.5 times the focal length may therefore be constructed from only five lens elements, thereby achieving compactness and light-weightness of the projection lens. Embodiment 7 is the same in other respects as Embodiment 1.

Embodiment 8

FIGS. 10A, 10B and 10C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 8 is viewed from the small conjugate side.

As in the case of projection lens shown in FIG. 8 (Embodiment 7), the retrofocus projection lens of Embodiment 8 comprises five lens elements $L_1$ to $L_5$ and an aperture stop AST. Specific examples of the retrofocus projection lens of Embodiment 8 are as shown in Table 8 below. The symbols in Table 8 have the same significance as those in Embodiment 1.

TABLE 8

| f = 135.02 | θ = 21.40° | F = 5.60 | M = 31.65 |
|---|---|---|---|
| $f_1$ = −118.15 | $f_2$ = 91.45 | $f_3$ = 645.90 | |
| $D_1$ = 54.14 | BF = 207.00 | | |
| $f_1/f$ = −0.88 | $f_2/f_3$ = 0.14 | | |
| $D_1/f$ = 0.40 | $r_7/f$ = 1.56 | | |

| m | $r_i$ | $d_i$ | $n_i$ | $v_i$ | |
|---|---|---|---|---|---|
| 1: | 231.05531 | 3.40 | 1.622994 | 58.12 | |
| 2: | 55.67938 | 54.14 | | | |
| 3: | 91.35753 | 8.51 | 1.639803 | 34.57 | |
| 4: | −159.79829 | 16.47 | | | |
| 5: | INFINITY | 8.01 | | | AST |
| 6: | −64.05870 | 19.00 | 1.784715 | 25.70 | |
| 7: | 210.74404 | 3.63 | | | |
| 8: | −114.58499 | 6.08 | 1.622994 | 58.12 | |
| 9: | −66.74842 | 0.30 | | | |
| 10: | 1180.48627 | 9.45 | 1.677901 | 55.52 | |
| 11: | −76.32334 | | | | |

The retrofocus projection lens of Embodiment 8 also satisfies the aforesaid relations (9) to (12), hence the same effect is obtained as in Embodiment 7. Embodiment 8 is the same in other respects as Embodiment 7.

Embodiment 9

FIGS. 11A, 11B and 11C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 9 is viewed from the small conjugate side.

As is the case of projection lens shown in FIG. 8 (Embodiment 7), the retrofocus projection lens of Embodiment 9 comprises five lens elements $L_1$ to $L_5$ and an aperture stop AST. Specific examples of the retrofocus projection lens of Embodiment 9 are as shown in Table 9 below. The symbols in Table 9 have the same significance as those in Embodiment 1.

TABLE 9

| f = 135.03 | θ = 21.40° | F = 5.60 | M = 31.65 |
|---|---|---|---|
| $f_1$ = −118.16 | $f_2$ = 91.54 | $f_3$ = 642.33 | |
| $D_1$ = 54.14 | BF = 207.13 | | |
| $f_1/f$ = −0.88 | $f_2/f_3$ = 0.14 | | |
| $D_1/f$ = 0.40 | $r_7/f$ = 1.57 | | |

| m | $r_i$ | $d_i$ | $n_i$ | $v_i$ | |
|---|---|---|---|---|---|
| 1: | 230.19000 | 3.40 | 1.622994 | 58.12 | |
| 2: | 55.63000 | 54.14 | | | |
| 3: | 91.55000 | 8.51 | 1.639803 | 34.57 | |
| 4: | −159.65000 | 16.47 | | | |
| 5: | INFINITY | 8.01 | | | AST |
| 6: | −64.00000 | 19.00 | 1.784715 | 25.70 | |
| 7: | 212.20000 | 3.63 | | | |

TABLE 9-continued

| | | | | |
|---|---|---|---|---|
| 8: | −114.95000 | 6.08 | 1.622994 | 58.12 |
| 9: | −66.81000 | 0.30 | | |
| 10: | 1215.06700 | 9.45 | 1.677901 | 55.52 |
| 11: | −76.29000 | | | |

The retrofocus projection lens of Embodiment 9 also satisfies the aforesaid relations (9) to (12), hence the same effect is obtained as in Embodiment 7. Embodiment 9 is the same in other respects as Embodiment 7.

Embodiment 10

FIGS. 12A, 12B and 12C are characteristic curves showing spherical aberration (wavelength $WL_1$=610 [nm], $WL_2$= 546.1 [nm] (e line), $WL_3$=470 [nm]), astigmatism (wavelength 546.1 [nm]) and distortion (wavelength 546.1 [nm]) when the retrofocus projection lens of Embodiment 10 is viewed from the small conjugate side.

As in the case of projection lens shown in FIG. 8 (Embodiment 7), the retrofocus projection lens of Embodiment 10 comprises five lens elements $L_1$ to $L_5$ and an aperture stop AST. Specific examples of the retrofocus projection lens of Embodiment 10 are as shown in Table 10 below. The symbols in Table 10 have the same significance as those in Embodiment 1.

TABLE 10

| f = 130.00 | θ = 22.15° | F = 5.60 | M = 31.65 |
|---|---|---|---|
| $f_1$ = −118.89 | $f_2$ = 89.45 | $f_3$ = 719.25 | |
| $D_1$ = 56.73 | BF = 200.00 | | |
| $f_1/f$ = −0.91 | $f_2/f_3$ = 0.12 | | |
| $D_1/f$ = 0.44 | $r_7/f$ = 1.61 | | |

| m | $r_i$ | $d_i$ | $n_i$ | $v_i$ | |
|---|---|---|---|---|---|
| 1: | 215.53737 | 3.20 | 1.622994 | 58.12 | |
| 2: | 54.97765 | 56.73 | | | |
| 3: | 90.17594 | 8.29 | 1.639803 | 34.57 | |
| 4: | −153.85212 | 16.54 | | | |
| 5: | INFINITY | 7.16 | | | AST |
| 6: | −61.37445 | 18.49 | 1.784715 | 25.70 | |
| 7: | 209.52765 | 3.34 | | | |
| 8: | −107.01537 | 5.85 | 1.622994 | 58.12 | |
| 9: | −63.83131 | 0.30 | | | |
| 10: | 1409.19121 | 9.10 | 1.677901 | 55.52 | |
| 11: | −73.61622 | | | | |

The retrofocus projection lens of Embodiment 10 also satisfies the aforesaid relations (9) to (12), hence the same effect is obtained as in Embodiment 7. Embodiment 10 is the same in other respects as Embodiment 7.

Embodiment 11

FIGS. 13A, 13B and 13C are characteristic curves showing spherical aberration (wavelength $WL_1$=610 [nm], $WL_2$= 546.1 [nm] (e line), $WL_3$=470 [nm]), astigmatism (wavelength 546.1 [nm]) and distortion (wavelength 546.1 [nm]) when the retrofocus projection lens of Embodiment 11 is viewed from the small conjugate side.

As in the case of projection lens shown in FIG. 8 (Embodiment 7), the retrofocus projection lens of Embodiment 11 comprises five lens elements $L_1$ to $L_5$ and an aperture stop AST. Specific examples of the retrofocus projection lens of Embodiment 11 are as shown in Table 11 below. The symbols in Table 11 have the same significance as those in Embodiment 1.

TABLE 11

| f = 130.00 | θ = 22.14° | F = 5.60 | M = 31.65 |
|---|---|---|---|
| $f_1$ = −127.84 | $f_2$ = 89.69 | $f_3$ = 660.64 | |
| $D_1$ = 55.61 | BF = 195.00 | | |
| $f_1/f$ = −0.98 | $f_2/f_3$ = 0.14 | | |
| $D_1/f$ = 0.43 | $r_7/f$ = 1.62 | | |

| m | $r_i$ | $d_i$ | $n_i$ | $v_i$ | |
|---|---|---|---|---|---|
| 1: | 192.60347 | 3.20 | 1.622994 | 58.12 | |
| 2: | 56.14707 | 55.61 | | | |
| 3: | 90.54577 | 8.37 | 1.639803 | 34.57 | |
| 4: | −153.85212 | 18.05 | | | |
| 5: | INFINITY | 5.38 | | | AST |
| 6: | −60.09243 | 19.31 | 1.784715 | 25.70 | |
| 7: | 210.22004 | 3.83 | | | |
| 8: | −96.61431 | 5.85 | 1.622994 | 58.12 | |
| 9: | −61.39003 | 0.30 | | | |
| 10: | 1045.89670 | 9.10 | 1.677901 | 55.52 | |
| 11: | −72.99371 | | | | |

The retrofocus projection lens of Embodiment 11 also satisfies the aforesaid relations (9) to (12), hence the same effect is obtained as in Embodiment 7. Embodiment 11 is the same in other respects as Embodiment 7.

Embodiment 12

FIGS. 14A, 14B and 14C are characteristic curves showing spherical aberration (wavelength $WL_1$=610 [nm], $WL_2$= 546.1 [nm] (e line), $WL_3$=470 [nm]), astigmatism (wavelength 546.1 [nm]) and distortion (wavelength 546.1 [nm]) when the retrofocus projection lens of Embodiment 12 is viewed from the small conjugate side.

As in the case of projection lens shown in FIG. 8 (Embodiment 7), the retrofocus projection lens of Embodiment 12 comprises five lens elements $L_1$ to $L_5$ and an aperture stop AST. Specific examples of the retrofocus projection lens of Embodiment 12 are as shown in Table 12 below. The symbols in Table 12 have the same significance as those in Embodiment 1.

TABLE 12

| f = 123.99 | θ = 23.10° | F = 5.60 | M = 31.65 |
|---|---|---|---|
| $f_1$ = −117.67 | $f_2$ = 89.22 | $f_3$ = 457.00 | |
| $D_1$ = 50.56 | BF = 189.99 | | |
| $f_1/f$ = −0.95 | $f_2/f_3$ = 0.20 | | |
| $D_1/f$ = 0.41 | $r_7/f$ = 1.53 | | |

| m | $r_i$ | $d_i$ | $n_i$ | $v_i$ | |
|---|---|---|---|---|---|
| 1: | 242.75768 | 3.20 | 1.658435 | 50.85 | |
| 2: | 58.63218 | 50.56 | | | |
| 3: | 92.60793 | 15.41 | 1.647693 | 33.84 | |
| 4: | −146.28866 | 20.95 | | | |
| 5: | INFINITY | 2.92 | | | AST |
| 6: | −53.01434 | 19.00 | 1.755198 | 27.53 | |
| 7: | 189.63693 | 3.44 | | | |
| 8: | −82.96672 | 5.56 | 1.622994 | 58.12 | |
| 9: | −55.02751 | 0.30 | | | |
| 10: | 265.66035 | 8.65 | 1.589128 | 61.25 | |
| 11: | −65.22552 | | | | |

The retrofocus projection lens of Embodiment 12 also satisfies the aforesaid relations (9) to (12), hence the same effect is obtained as in Embodiment 7. Embodiment 12 is the same in other respects as Embodiment 7.

Embodiment 13

FIGS. 15A, 15B and 15C are characteristic curves showing spherical aberration (wavelength $WL_1$=610 [nm], $WL_2$= 546.1 [nm] (e line), $WL_3$=470 [nm]), astigmatism (wavelength 546.1 [nm]) and distortion (wavelength 546.1 [nm]) when the retrofocus projection lens of Embodiment 13 is viewed from the small conjugate side.

As in the case of projection lens shown in FIG. 8 (Embodiment 7), the retrofocus projection lens of Embodiment 13 comprises five lens elements $L_1$ to $L_5$ and an aperture stop AST. Specific examples of the retrofocus projection lens of Embodiment 13 are as shown in Table 13 below. The symbols in Table 13 have the same significance as those in Embodiment 1.

TABLE 13

| f = 124.00 | θ = 23.11° | F = 5.60 | M = 31.65 |
|---|---|---|---|
| $f_1$ = −120.21 | $f_2$ = 86.22 | $f_3$ = 820.50 | |
| $D_1$ = 58.39 | BF = 190.00 | | |
| $f_1/f$ = −0.97 | $f_2/f_3$ = 0.11 | | |
| $D_1/f$ = 0.47 | $r_7/f$ = 1.60 | | |

| m | $r_i$ | $d_i$ | $n_i$ | $v_i$ | |
|---|---|---|---|---|---|
| 1: | 193.53277 | 3.20 | 1.622994 | 58.12 | |
| 2: | 53.80899 | 58.39 | | | |
| 3: | 87.37497 | 8.35 | 1.639803 | 34.57 | |
| 4: | −146.75123 | 16.61 | | | |
| 5: | INFINITY | 5.68 | | | AST |
| 6: | −58.63709 | 18.00 | 1.784715 | 25.70 | |
| 7: | 198.95983 | 3.20 | | | |
| 8: | −99.27478 | 5.58 | 1.622994 | 58.12 | |
| 9: | −61.02115 | 0.30 | | | |
| 10: | 1436.68281 | 8.68 | 1.677901 | 55.52 | |
| 11: | −70.35745 | | | | |

The retrofocus projection lens of Embodiment 13 also satisfies the aforesaid relations (9) to (12), hence the same effect is obtained as in Embodiment 7. Embodiment 13 is the same in other respects as Embodiment 7.

Embodiment 14

Figure 16:
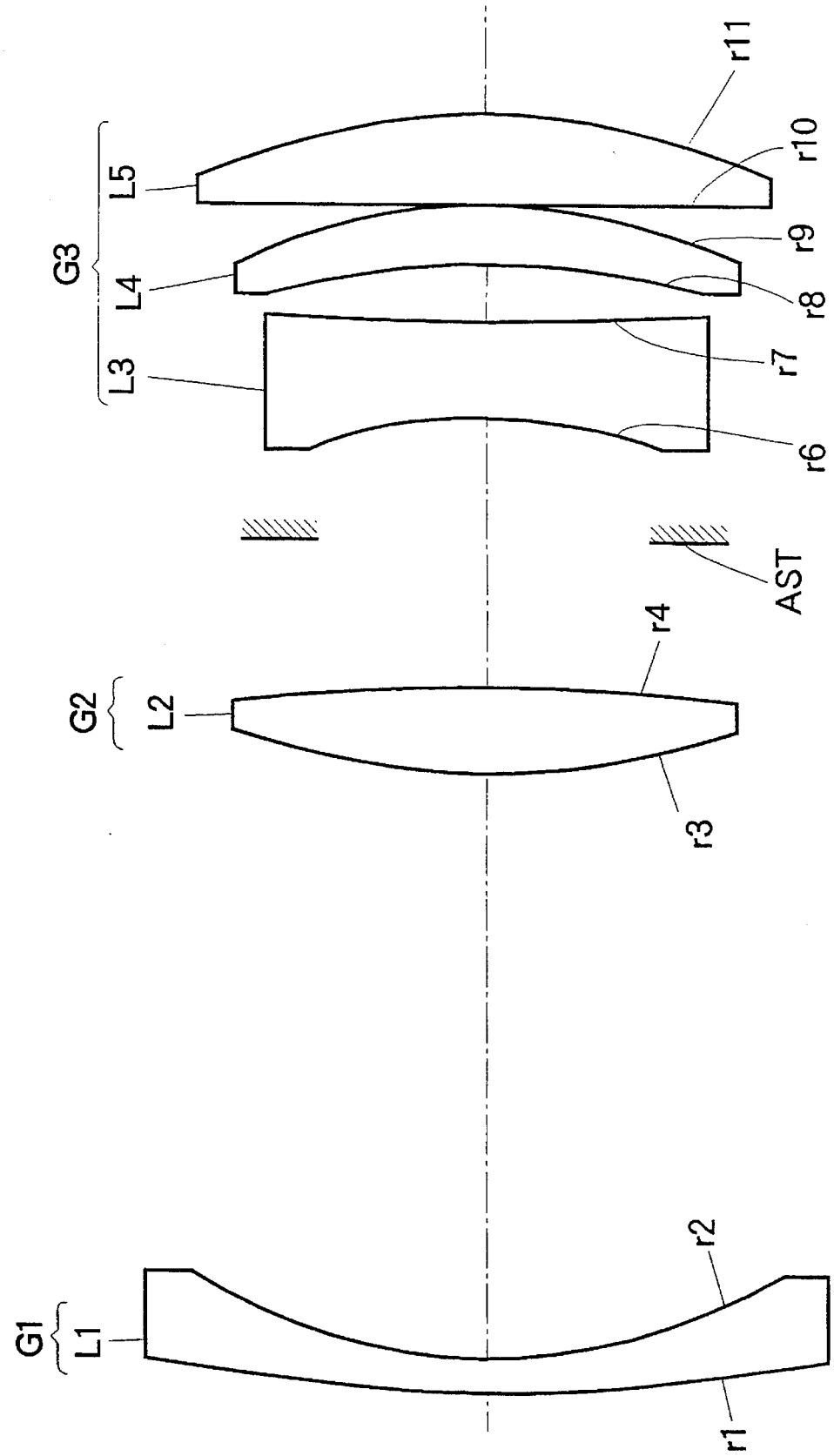
FIG. 16 is a diagram schematically showing the construction of a retrofocus projection lens according to Embodiment 14.

FIG. 16 is diagram schematically showing the construction of a retrofocus projection lens according to a Embodiment 14. In FIG. 16, parts identical to those of FIG. 1 are given the same numerals, and their description is omitted.

In the projection lens according to Embodiment 14:

$$0.35 < D_1/f < 0.55 \quad (13)$$

$$0.1 < f_2/f_3 < 0.2 \quad (14)$$

$$0.9 < |f_1|/f < 1.2 \quad (15)$$

where $D_1$ is the air gap between the first lens group $G_1$ and the second lens group $G_2$, $f_1$ is the focal length of the first lens group $G_1$, $f_2$ is the focal length of the second lens group $G_2$, $f_3$ is the focal length of the third lens group $G_3$, and f is the focal length of the whole lens system comprising the first, second and third lens groups.

The reasons why the above relations (13), (14), (15) must be satisfied are the same as the reasons why the above relations (5), (6), (7), described hereinbefore in Embodiment 1, must be satisfied.

Further, in addition to the above relations (13) (14, (15, the retrofocus projection lens of Embodiment 14 satisfies the following relation (16):

$$1.0 < r_7/f < 1.6 \quad (16)$$

The reason why it is necessary to satisfy relation (16) is the same as the reason why it is necessary to satisfy the above relation (8) in Embodiment 1.

FIGS. 17A, 17B and 17C are characteristic curves showing the spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 14 is viewed from the small conjugate side. Specific examples of the retrofocus projection lens of Embodiment 14 are as shown in Table 14 below. The symbols in Table 14 have the same significance as those in Embodiment 1.

TABLE 14

| f = 135.00 | θ = 21.40° | F = 5.60 | M = 31.65 |
|---|---|---|---|
| $f_1$ = −130.27 | $f_2$ = 95.12 | $f_3$ = 678.42 | |
| $D_1$ = 58.64 | BF = 200.00 | | |
| $f_1/f$ = −0.97 | $f_2/f_3$ = 0.14 | | |
| $D_1/f$ = 0.43 | $r_7/f$ = 1.25 | | |

| m | $r_i$ | $d_i$ | $n_i$ | $v_i$ | |
|---|---|---|---|---|---|
| 1: | 196.49830 | 3.40 | 1.622994 | 58.12 | |
| 2: | 57.21980 | 58.64 | | | |
| 3: | 84.98313 | 8.51 | 1.639803 | 34.57 | |
| 4: | −210.98850 | 15.16 | | | |
| 5: | INFINITY | 11.38 | | | AST |
| 6: | −66.51264 | 10.00 | 1.784715 | 25.70 | |
| 7: | 168.81910 | 6.08 | | | |
| 8: | −110.94350 | 6.08 | 1.622994 | 58.12 | |
| 9: | −65.54149 | 0.30 | | | |
| 10: | 609.05390 | 9.45 | 1.677901 | 55.52 | |
| 11: | −77.57952 | | | | |

The retrofocus projection lens according to Embodiment 14 satisfies the above relations (13) to (16). A projection lens having an F number of at least 5.6, a half field angle of approx. 20 to 24 and a back focal length of approx. 1.5 times the focal length may therefore be constructed from only five lens elements, thereby achieving compactness and lightweightness of the projection lens. Embodiment 14 is the same in other respects as Embodiment 1.

Embodiment 15

Figures 18A, 18B, 18C:
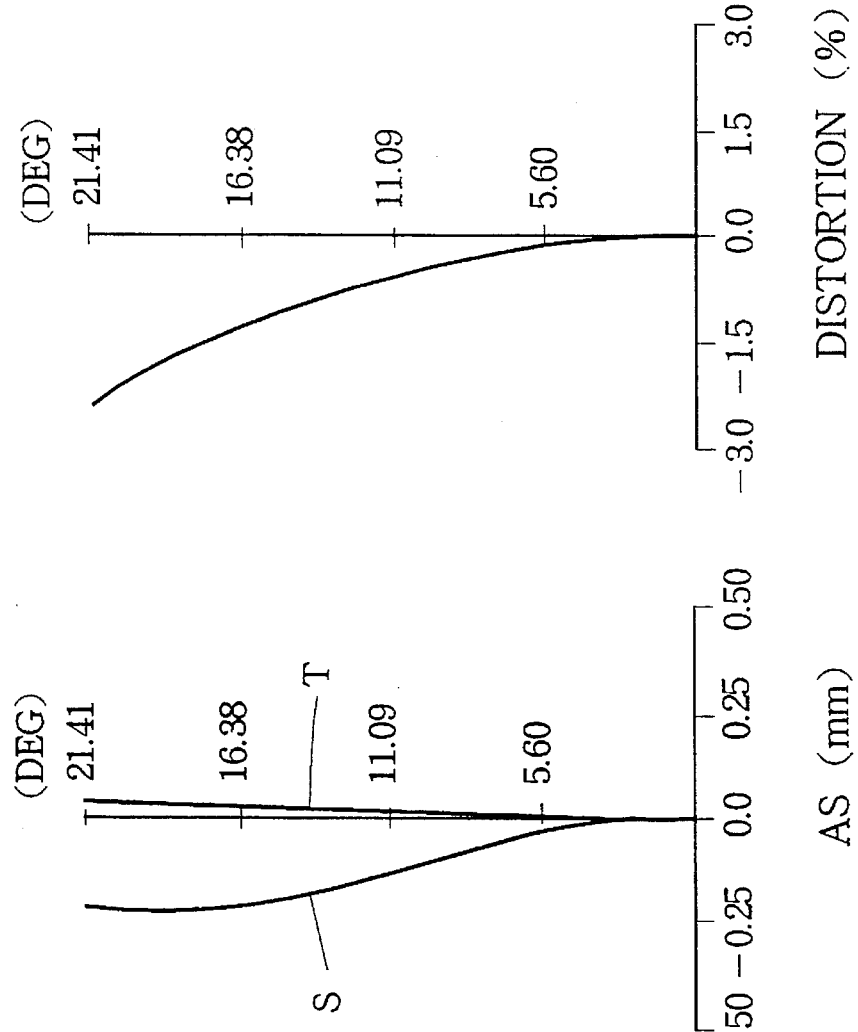

FIGS. 18A, 18B and 18C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 15 is viewed from the small conjugate side.

As in the case of projection lens shown in FIG. 16 (Embodiment 14), the retrofocus projection lens of Embodiment 15 comprises five lens elements $L_1$ to $L_5$ and an aperture stop AST. Specific examples of the retrofocus projection lens of Embodiment 15 are as shown in Table 15 below. The symbols in Table 15 have the same significance as those in Embodiment 1.

TABLE 15

| f = 135.01 | θ = 21.40° | F = 5.60 | M = 31.64 |
|---|---|---|---|
| $f_1$ = −127.88 | $f_2$ = 94.46 | $f_3$ = 618.96 | |
| $D_1$ = 56.64 | BF = 199.99 | | |
| $f_1/f$ = −0.95 | $f_2/f_3$ = 0.15 | | |
| $D_1/f$ = 0.42 | $r_7/f$ = 1.37 | | |

| m | $r_i$ | $d_i$ | $n_i$ | $v_i$ | |
|---|---|---|---|---|---|
| 1: | 198.58310 | 3.40 | 1.622994 | 58.12 | |
| 2: | 56.64689 | 56.64 | | | |
| 3: | 86.00154 | 8.51 | 1.639803 | 34.57 | |
| 4: | −199.98630 | 13.72 | | | |
| 5: | INFINITY | 13.50 | | | AST |
| 6: | −67.78859 | 10.00 | 1.805182 | 25.39 | |
| 7: | 184.99580 | 7.41 | | | |
| 8: | −133.98770 | 6.08 | 1.617997 | 63.40 | |
| 9: | −68.32479 | 0.30 | | | |
| 10: | 1404.78800 | 9.45 | 1.712999 | 53.94 | |
| 11: | −82.25062 | | | | |

The retrofocus projection lens of Embodiment 15 also satisfies the aforesaid relations (13) to (16), hence the same effect is obtained as in Embodiment 14. Embodiment 15 is the same in other respects as Embodiment 14.

Embodiment 16

Figure 19C:
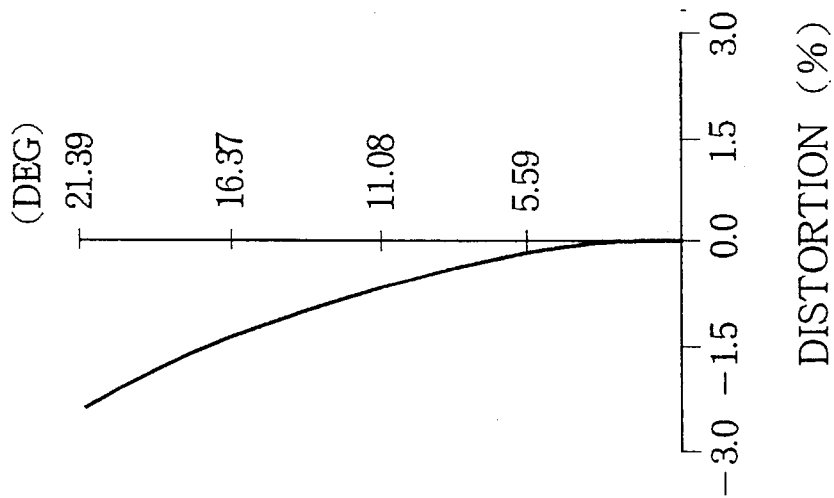
FIGS. 19A, 19B and 19C are characteristic curves showing the spherical aberration, astigmatism and distortion of Embodiment 16.
Figure 19B:
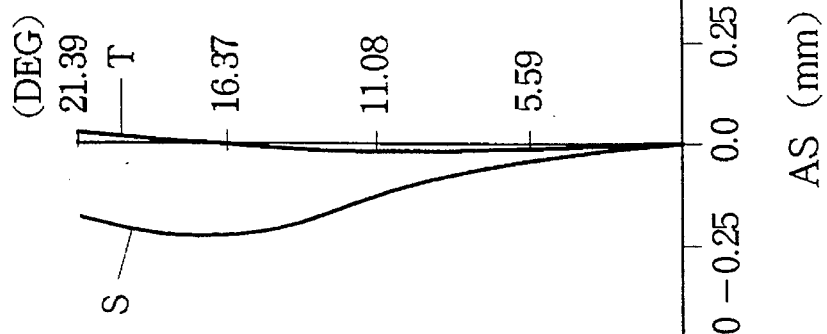
Figure 19A:
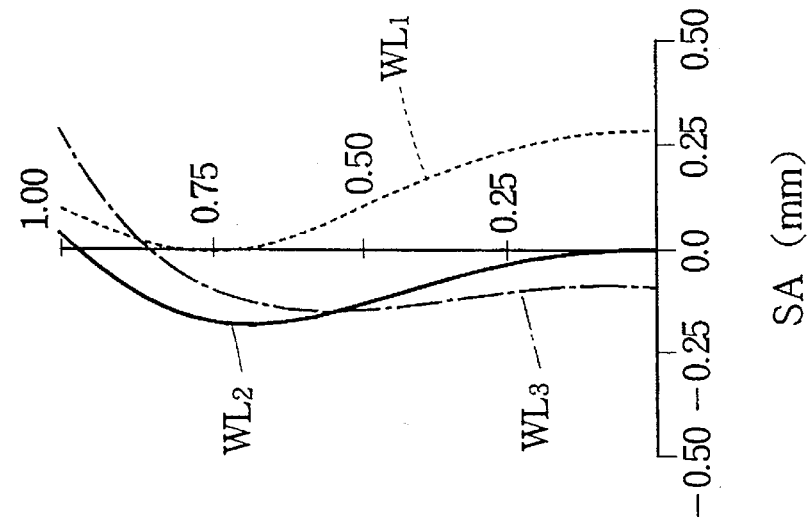

FIGS. 19A, 19B and 19C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 16 is viewed from the small conjugate side.

As in the case of projection lens shown in FIG. 16 (Embodiment 14), the retrofocus projection lens of Embodiment 16 comprises five lens elements $L_1$ to $L_5$ and an aperture stop AST. Specific examples of the retrofocus projection lens of Embodiment 16 are as shown in Table 16 below. The symbols in Table 16 have the same significance as those in Embodiment 1.

TABLE 16

| f = 135.00 | θ = 21.39° | F = 5.60 | M = 31.65 |
|---|---|---|---|
| $f_1$ = −133.96 | $f_2$ = 97.06 | $f_3$ = 696.04 | |
| $D_1$ = 61.53 | BF = 200.00 | | |
| $f_1/f$ = −0.99 | $f_2/f_3$ = 0.14 | | |
| $D_1/f$ = 0.46 | $r_7/f$ = 1.24 | | |

| m | $r_i$ | $d_i$ | $n_i$ | $v_i$ | |
|---|---|---|---|---|---|
| 1: | 189.44770 | 3.00 | 1.622994 | 58.12 | |
| 2: | 57.74626 | 61.53 | | | |
| 3: | 84.85876 | 7.00 | 1.639803 | 34.57 | |
| 4: | −229.85890 | 16.65 | | | |
| 5: | INFINITY | 11.35 | | | AST |
| 6: | −66.41267 | 8.00 | 1.784715 | 25.70 | |
| 7: | 166.81750 | 7.17 | | | |
| 8: | −112.30800 | 6.00 | 1.622994 | 58.12 | |
| 9: | −65.83923 | 0.30 | | | |
| 10: | 626.84470 | 7.00 | 1.677901 | 55.52 | |
| 11: | −77.04755 | | | | |

The retrofocus projection lens of Embodiment 16 also satisfies the aforesaid relations (13) to (16), hence the same effect is obtained as in Embodiment 14. Embodiment 16 is the same in other respects as Embodiment 14.

Embodiment 17

FIGS. 20A, 20B and 20C are characteristic curves showing spherical aberration (wavelength $WL_1$=610 [nm], $WL_2$=546.1 [nm] (e line), $WL_3$=470 [nm]), astigmatism (wavelength 546.1 [nm]) and distortion (wavelength 546.1 [nm]) when the retrofocus projection lens of Embodiment 17 is viewed from the small conjugate side.

As in the case of projection lens shown in FIG. 16 (Embodiment 14), the retrofocus projection lens of Embodiment 17 comprises five lens elements $L_1$ to $L_5$ and an aperture stop AST. Specific examples of the retrofocus projection lens of Embodiment 17 are as shown in Table 17 below. The symbols in Table 17 have the same significance as those in Embodiment 1.

TABLE 17

| f = 135.00 | θ = 21.39° | F = 5.60 | M = 31.65 |
|---|---|---|---|
| $f_1$ = −133.87 | $f_2$ = 96.88 | $f_3$ = 747.99 | |
| $D_1$ = 62.49 | BF = 200.00 | | |
| $f_1/f$ = −0.99 | $f_2/f_3$ = 0.13 | | |
| $D_1/f$ = 0.46 | $r_7/f$ = 1.22 | | |

| m | $r_i$ | $d_i$ | $n_i$ | $v_i$ | |
|---|---|---|---|---|---|
| 1: | 186.73820 | 3.00 | 1.622994 | 58.12 | |
| 2: | 57.45747 | 62.49 | | | |
| 3: | 84.20648 | 7.00 | 1.639803 | 34.57 | |
| 4: | −233.26380 | 15.88 | | | |
| 5: | INFINITY | 12.11 | | | AST |
| 6: | −66.63300 | 7.00 | 1.784715 | 25.70 | |
| 7: | 164.29160 | 7.22 | | | |

TABLE 17-continued

| 8: | −116.04430 | 6.00 | 1.622994 | 58.12 |
|---|---|---|---|---|
| 9: | −66.43844 | 0.30 | | |
| 10: | 702.48550 | 7.00 | 1.677901 | 55.52 |
| 11: | −76.74786 | | | |

The retrofocus projection lens of Embodiment 17 also satisfies the aforesaid relations (13) to (16), hence the same effect is obtained as in Embodiment 14. Embodiment 17 is the same in other respects as Embodiment 14.

Embodiment 18

Figure 21:
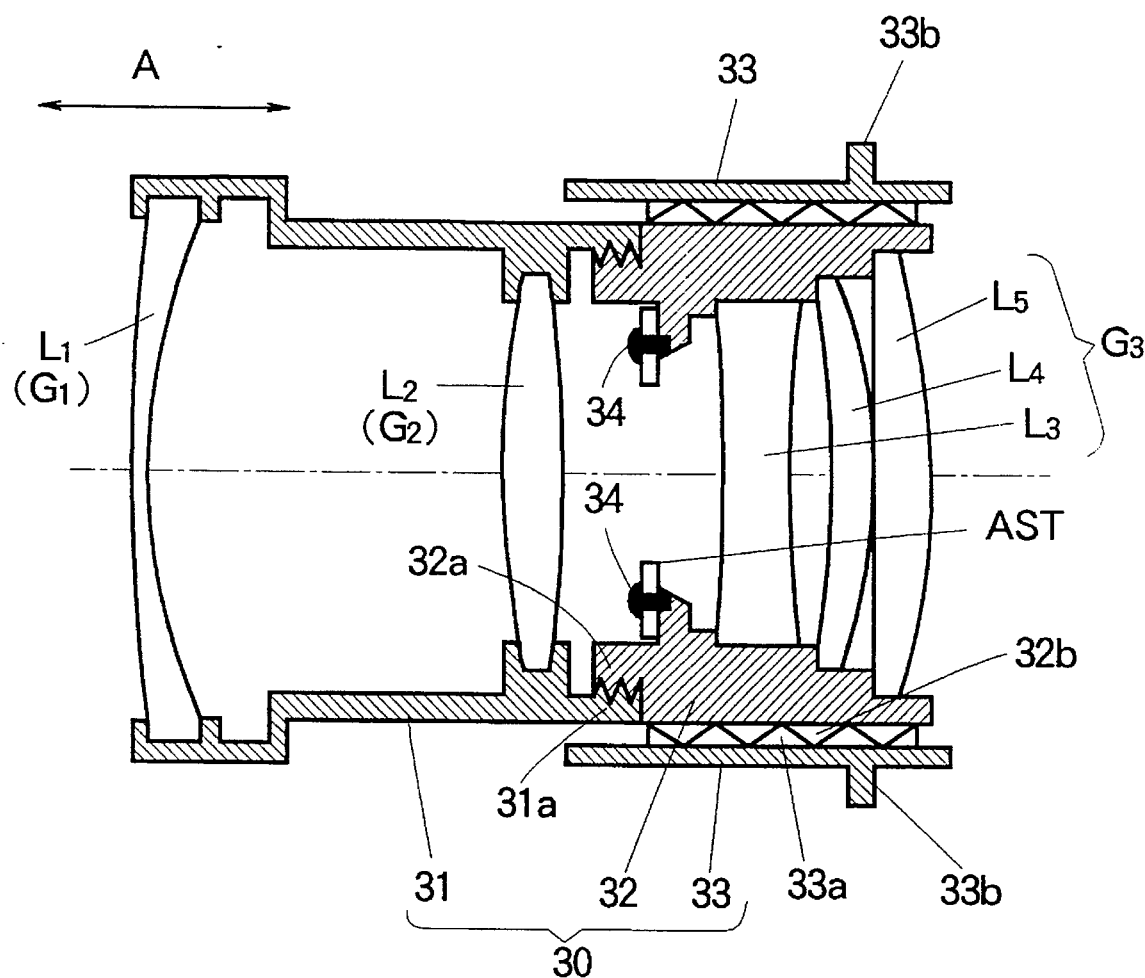
FIG. 21 is a sectional view schematically showing the structure of the retrofocus projection lens of Embodiment 18.
Figure 22:
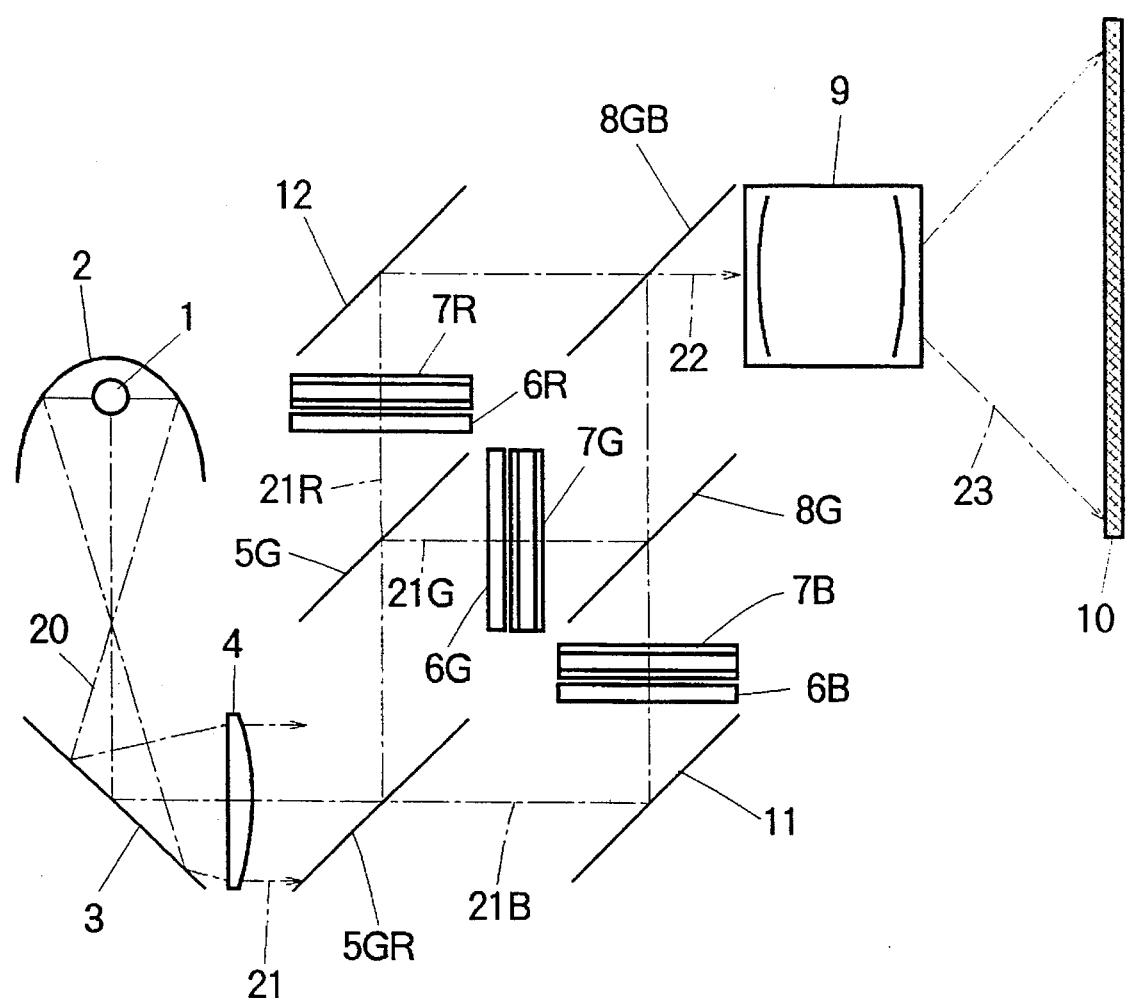
FIG. 22 is a schematic diagram of the optical system of a conventional liquid crystal projector.

FIG. 21 is a sectional view schematically showing the structure of the retrofocus projection lens of Embodiment 18. As shown in FIG. 21, in the retrofocus projection lens of Embodiment 18, first, second and third lens groups $G_1$ to $G_3$ and an aperture stop AST are supported in a lens barrel 30. The first, second and third lens groups $G_1$ to $G_3$ and the aperture stop AST may be designed according to any of the arrangements in the aforesaid Embodiments 1 to 17.

A lens barrel assembly 30 comprises a first lens barrel 31, a second lens barrel 32 joined to the first lens barrel 31, and a third lens barrel 33 supporting the second lens barrel. The first lens barrel 31 and second lens barrel are joined by the engaging of a screw 31a formed in the first lens barrel 31 with a screw 32a formed in the second lens barrel 32. This second lens barrel 32 is supported by the engaging of a screw 32b formed on its outer circumference with a screw 33a formed on the inner circumference of the third lens barrel 33. The third lens barrel 33 is positioned on an optical base (not shown in the figure) that supports the optical system of the liquid crystal projector by means of a flange 33b.

The first lens barrel 31 supports the first lens group $G_1$ and second lens group $G_2$. The second lens barrel 32 supports the aperture stop plate AST fixed by a machine screw 34, and the third lens group $G_3$ comprising the third, fourth and fifth lenses $L_3$ to $L_5$.

The aperture stop plate AST may for example consist of a thin metal plate provided with a circular hole. When the aperture stop plate AST is replaced by another aperture stop plate having a different diameter, the first lens barrel 31 is rotated with respect to the second lens barrel 32, the first lens barrel 31 is removed, the aperture stop plate AST is removed by loosening the machine screw 34, the other aperture stop plate is attached by means of the machine screw 34, and the first lens barrel 31 is then again joined to the second lens barrel 32. By replacing the aperture stop plate AST in this way, the effective F number of the projection lens can be varied.

In order to focus the projected image, the whole lens system supported by the first and second lens barrels 31, 32 may be moved forwards and backwards in the direction of the optical axis, as shown by the arrow A in FIG. 21. The second lens barrel 32 joined to the third lens barrel 33 by the screw 32b is rotated inside the third lens barrel 33 so as to move the first and second lens barrels 31, 32 in the direction of the optical axis.

What is claimed is:

1. A retrofocus projection lens comprising:

a first lens group having a negative refracting power;

a second lens group having a positive refracting power; and a third lens group having a positive refracting power;

said first to third lens groups being arranged in this order from a large conjugate side;

said first lens group including a convex negative meniscus lens on the large conjugate side;

said second lens group including a biconvex positive lens; and said third lens group including, in order from the large conjugate side, a biconcave negative lens, a convex positive meniscus lens on a small conjugate side and a biconvex positive lens;

wherein said first to third lens groups satisfy the following relations (1) to (3):

$$0.25 < D_1/f < 0.55 \tag{1}$$

$$0.05 < f_2/f_3 < 0.4 \tag{2}$$

$$0.8 < |f_1|/f < 1.2 \tag{3}$$

where $D_1$ is air gap between said first lens group and said second lens group, $f_1$ is focal length of said first lens group, $f_2$ is focal length of said second lens group, $f_3$ is focal length of said third lens group, and f is focal length of whole lens system including said first to third lens groups.

2. A retrofocus projection lens as defined in claim 1 further comprising aperture stop means disposed between said second lens group and said third lens group.

3. A retrofocus projection lens as defined in claim 2 further comprising means for varying an aperture diameter of said aperture stop means.

4. A retrofocus projection lens as defined in claim 1, wherein the following relation (4) is satisfied:

$$1.0 < r_7/f < 3.1 \tag{4}$$

where a curvature radius of a face on the small conjugate side of said biconcave negative lens in said third lens group is $r_7$.

5. A retrofocus projection lens as defined in claim 2, further comprising lens barrel means for supporting said first to third lens groups and said aperture stop means;

said lens barrel means including a first lens barrel for supporting said first lens group and said second lens group, and a second lens barrel for supporting said third lens group and said aperture stop means; and said second lens barrel being joined to said first lens barrel such that it can be separated therefrom;

wherein said aperture stop means is installed in such a position that it can be removed from said second lens barrel means when said first lens barrel and said second lens barrel are separated.

* * * * *